United States Patent
Tsujii et al.

(10) Patent No.: US 8,260,504 B2
(45) Date of Patent: Sep. 4, 2012

(54) SADDLE RIDING TYPE VEHICLE

(75) Inventors: Eiichirou Tsujii, Shizuoka (JP); Yosuke Hirayama, Shizuoka (JP); Atsushi Imai, Shizuoka (JP); Kazuhiro Nishida, Shizuoka (JP); Masayuki Hirano, Shizuoka (JP); Toshio Takeuchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 448 days.

(21) Appl. No.: 12/646,216

(22) Filed: Dec. 23, 2009

(65) Prior Publication Data

US 2010/0168966 A1  Jul. 1, 2010

(30) Foreign Application Priority Data

Dec. 26, 2008  (JP) ................... 2008-333682

(51) Int. Cl.
 *G06F 17/00* (2006.01)
(52) U.S. Cl. ............... 701/48; 701/49; 362/466
(58) Field of Classification Search .......... 701/36, 701/48, 49, 124, 70; 362/460, 465, 466; 340/458

See application file for complete search history.

(56) References Cited

U.S. PATENT DOCUMENTS

| 6,374,171 B2 * | 4/2002 | Weiberle et al. ............... 701/71 |
| 2004/0114382 A1 | 6/2004 | Sakai |
| 2008/0103661 A1 | 5/2008 | Sugimoto et al. |

FOREIGN PATENT DOCUMENTS

| EP | 0 475 093 A1 | 3/1992 |
| EP | 1 288 069 A2 | 3/2003 |
| JP | 02-182549 A | 7/1990 |
| JP | 6-115397 A | 4/1994 |
| JP | 2004-182195 A | 7/2004 |
| JP | 2005-119615 A | 5/2005 |
| JP | 2006-306177 A | 11/2006 |
| JP | 2006-315674 A | 11/2006 |
| JP | 2008-110687 A | 5/2008 |
| WO | 2008/100398 A2 | 8/2008 |

OTHER PUBLICATIONS

Official Communication issued in corresponding European Patent Application No. 09180724.8, mailed on Mar. 31, 2010.

* cited by examiner

*Primary Examiner* — Richard M. Camby
(74) *Attorney, Agent, or Firm* — Keating & Bennett, LLP

(57) ABSTRACT

A saddle riding type vehicle includes a balancer beam rotatably mounted on a vehicle body to cause a right wheel and a left wheel to move up and down in opposite directions, and is capable of making turns by leaning the vehicle body. The saddle riding type vehicle also includes a headlight, a drive mechanism arranged to rotate the headlight, a front detector arranged to detect a rotation angle of the balancer beam relative to the vehicle body, and a controller programmed to control the drive mechanism based on a result of detection by the front detector. The rotation angle detected by the front detector corresponds to an angle of the vehicle body leaning sideways relative to a traveling surface (relative lean angle). The controller controls the drive mechanism based on such result of detection by the front detector. The headlight can therefore illuminate directions of movement properly.

15 Claims, 11 Drawing Sheets

SADDLE RIDING TYPE VEHICLE

BACKGROUND OF THE INVENTION

1. Field of the Invention

The present invention relates to a saddle riding type vehicle which is a three-wheeled or four-wheeled automotive vehicle including a right wheel and a left wheel arranged at opposite sides of a vehicle body to be movable up and down, and is capable of making turns by leaning the vehicle body. Such a saddle riding type vehicle can appropriately illuminate directions of its movement with a headlight when making turns by leaning the vehicle body.

2. Description of the Related Art

A motorcycle has heretofore been proposed that has an onboard headlight that is rotatable, when making a turn, to illuminate the traveling surface ahead in the turning direction. When making a turn by leaning the vehicle body to the right, for example, the headlight is rotated to illuminate an area to the right and forward. When making a turn by leaning the vehicle body to the left, the headlight is rotated to illuminate an area to the left and forward as disclosed in Japanese Unexamined Patent Publication H6-115397 and Japanese Unexamined Patent Publication No. 2006-315674, for example.

Japanese Unexamined Patent Publication H6-115397 discloses a motorcycle having a headlight, a drive mechanism for rotating the headlight about an optical axis, various sensors, a control switch, and a controller for controlling the drive mechanism. The sensors include a lean angle sensor and a speed sensor, and the control switch is a dimmer switch. Based on detection results from the sensors and an input signal from the control switch, the controller rotates the headlight when predetermined conditions are fulfilled, such as when a vehicle speed is at a certain speed or faster, a lean angle is at a certain angle or larger, and the headlight is directed downward.

Further, the controller derives an angular speed from a lean angle, and increases the rotating speed and amount of rotation of the headlight when the angular speed is relatively high. As a result, no delay occurs in responding to a sudden position change of the vehicle body, and the headlight can appropriately illuminate a range of view to be seen by the rider.

Japanese Unexamined Patent Publication No. 2006-315674 discloses a three-wheeled automotive vehicle having a headlight, a right wheel and a left wheel arranged at opposite sides of a front portion of a vehicle body, and a suspension for supporting the right wheel and left wheel. The suspension can incline the right wheel and left wheel in response to leaning of the vehicle body. The suspension includes a plurality of beams and arms. A cross beam which is a member of the suspension is maintained substantially horizontal irrespective of inclinations of the right wheel and left wheel. The headlight is fixedly supported by this cross beam.

Therefore, even when the vehicle body leans relative to a traveling surface, the positional relationship of the headlight and the traveling surface remains constant. As a result, the headlight can continue illuminating the traveling surface in the direction of movement of the three-wheeled automotive vehicle.

However, the conventional vehicles with such constructions have the following drawbacks and disadvantages.

With the motorcycle described in Japanese Unexamined Patent Publication H6-115397, the relatively expensive lean angle sensor increases the manufacturing cost of the vehicle.

In addition, the lean angle sensor cannot detect positions of the motorcycle accurately or properly. Particularly where a traveling surface is sloping, an increased gap is created between an actual position of the motorcycle and a result of detection by the lean angle sensor. The controller controls the drive mechanism based on such a detection result from the lean angle sensor. As a result, there can be a possibility, for example, of the headlight being rotated when the motorcycle is not actually making a turn. Conversely, the headlight may not rotate although the motorcycle is making a turn. Thus, with the motorcycle according to Japanese Unexamined Patent Publication H6-115397, it is difficult to illuminate a traveling surface in the direction of movement properly with the headlight in various situations such as when the traveling surface is not horizontal.

With the three-wheeled automotive vehicle according to Japanese Unexamined Patent Publication No. 2006-315674, the cross beam which must be maintained horizontal restricts flexibility of the structure of the suspension. Since the headlight is fixed to the cross beam, the illuminating direction of the headlight cannot be varied flexibly. It is difficult to illuminate the direction of movement properly in various situations.

SUMMARY OF THE INVENTION

In view of the above, preferred embodiments of the present invention provide a saddle riding type vehicle including at least a pair of wheels and that is capable of making turns by leaning a vehicle body and capable of illuminating directions of movement properly via a headlight.

According to a preferred embodiment of the present invention, a saddle riding type vehicle capable of making turns by leaning a vehicle body includes a headlight, a drive mechanism arranged to rotate the headlight, a right wheel and a left wheel provided at opposite sides of the vehicle body to be movable up and down, a balancer member rotatably mounted on the vehicle body to cause the right wheel and the left wheel to move up and down in opposite directions, a detector arranged to detect a rotation angle of the balancer member relative to the vehicle body, and a controller programmed to control the drive mechanism based on a result of detection by the detector.

According to a preferred embodiment of the present invention, the balancer member is arranged to support the right wheel and left wheel to be movable up and down in substantially equal amounts in opposite directions. This enables the vehicle to make turns by leaning the vehicle body while maintaining both the right and left wheels in contact with the traveling surface. The rotation angle detected by the detector, i.e., the rotation angle of the balancer member relative to the vehicle body, is in a corresponding relationship with an angle of the vehicle body leaning sideways relative to the traveling surface (relative lean angle). Thus, with the controller controlling the drive mechanism based on a result of detection by the detector, the headlight can illuminate the direction of movement properly.

The detector, which is arranged to detect rotation angles between the vehicle body and balancer member rotatably interconnected, can be simple in construction. In other words, a lean angle sensor is not required. Thus, the manufacturing cost of the saddle riding type vehicle can be significantly reduced.

In a preferred embodiment of the present invention, it is preferable that the controller is programmed to calculate a relative lean angle which is an angle of the vehicle body leaning sideways relative to a traveling surface, based on the result of detection by the detector, and to cause an amount of rotation of the headlight relative to the vehicle body correspond to the relative lean angle. Since the controller causes an amount of rotation of the headlight relative to the vehicle body correspond to the relative lean angle, the headlight can illuminate the traveling direction properly.

In a preferred embodiment of the present invention, it is preferable that the vehicle further includes a right side support mechanism rockably supported by the vehicle body so as to support the right wheel to be movable up and down, and a left side support mechanism rockably supported by the vehicle body so as to support the left wheel to be movable up and down, the balancer member being interlocked to the right side support mechanism and the left side support mechanism, wherein the controller is programmed to use a connection lever ratio which is a ratio between a spacing between a connecting position where the right side support mechanism is connected to the right wheel and a connecting position where the left side support mechanism is connected to the left wheel, and a spacing between connecting positions where the right side support mechanism and the left side support mechanism are connected to the balancer member, respectively, using a suspension lever ratio which is a ratio between one of a rocking radius of the right wheel provided by the right side support mechanism and a rocking radius of the left wheel provided by the left side support mechanism, and one of a rocking radius of the balancer member provided by the right side support mechanism and a rocking radius of the balancer member provided by the left side support mechanism, and to calculate the relative lean angle by multiplying the rotation angle obtained from the detector by the connection lever ratio and the suspension lever ratio. By using the connection lever ratio and the suspension lever ratio provided by the right wheel, left wheel, right side support mechanism, left side support mechanism and balancer member, the relative lean angle can be calculated accurately from the rotation angle of the balancer member relative to the vehicle body.

In a preferred embodiment of the present invention, it is preferable that the right wheel and the left wheel include a pair of front wheels provided at a front portion of the vehicle body, the balancer member includes a front balancer member corresponding to the pair of front wheels, and the detector is a front detector arranged to detect a rotation angle of the front balancer member relative to the vehicle body. A preferred embodiment of the present invention, in which the right wheel and the left wheel are provided at least at the front portion of the vehicle body, may include a front balancer member and a front detector. With this construction, the front balancer member causes the pair of front wheels to move up and down in substantially equal amounts in opposite directions. Since the result of detection by the front detector corresponds to the relative lean angle, the controller can control the drive mechanism appropriately based on the result of detection by the front detector. Preferred embodiments of the present invention of this type preferably include both a four-wheeled automatic vehicle including two wheels at a rear portion of the vehicle body, and a three-wheeled automatic vehicle including a single wheel at a rear portion of the vehicle body.

In a preferred embodiment of the present invention, it is preferable that the right side support mechanism and the left side support mechanism include a front right side support mechanism and a front left side support mechanism arranged to support the pair of front wheels, respectively, and the controller is programmed to calculate the relative lean angle by multiplying the rotation angle obtained from the detector by the connection lever ratio and the suspension lever ratio corresponding to the pair of front wheels, the front right side support mechanism, the front left side support mechanism and the front balancer member. In the preferred embodiment in which the right wheel and the left wheel are provided at least at the front portion of the vehicle body, the controller can conveniently calculate the relative lean angle by using the connection lever ratio and suspension lever ratio relating to up-and-down movement of the pair of front wheels.

In a preferred embodiment of the present invention, it is preferable that the right wheel and the left wheel include a pair of rear wheels provided at a rear portion of the vehicle body, the balancer member includes a rear balancer member corresponding to the pair of rear wheels, and the detector is a rear detector arranged to detect a rotation angle of the rear balancer member relative to the vehicle body. The preferred embodiment, in which the right wheel and the left wheel are provided at least at the rear portion of the vehicle body, may include a rear balancer member and a rear detector. With this construction, the rear balancer member causes the pair of rear wheels to move up and down in substantially equal amounts in opposite directions. Since the result of detection by the rear detector corresponds to the relative lean angle, the controller can control the drive mechanism appropriately based on the result of detection by the rear detector. Preferred embodiments of this type preferably include both a four-wheeled automatic vehicle including two wheels at a front portion of the vehicle body, and a three-wheeled automatic vehicle including a single wheel at a front portion of the vehicle body.

In a preferred embodiment of the present invention, it is preferable that the right side support mechanism and the left side support mechanism include a rear right side support mechanism and a rear left side support mechanism arranged to support the pair of rear wheels, respectively; and the controller is programmed to calculate the relative lean angle by multiplying the rotation angle obtained from the detector by the connection lever ratio and the suspension lever ratio corresponding to the pair of rear wheels, the rear right side support mechanism, the rear left side support mechanism and the rear balancer member. In the preferred embodiment in which the right wheel and the left wheel are provided at least at the rear portion of the vehicle body, the controller can conveniently calculate the relative lean angle by using the connection lever ratio and suspension lever ratio relating to up-and-down movement of the pair of rear wheels.

In a preferred embodiment of the present invention, it is preferable that the headlight is rotatably supported by one of the vehicle body and the balancer member. In this way, the headlight can be installed easily and conveniently. Since the drive mechanism rotates the headlight relative to the vehicle body or balancer member in this case, the controller can easily calculate an amount of drive (control amount) of the drive mechanism. Thus, the controller can control rotation of the headlight simply.

In another preferred embodiment of the present invention, a saddle riding type vehicle that is capable of making turns by leaning a vehicle body includes a headlight, a drive mechanism arranged to rotate the headlight, a right wheel and a left wheel provided at opposite sides of the vehicle body to be movable up and down, a balancer member rotatably mounted on the vehicle body to cause the right wheel and the left wheel to move up and down in opposite directions, a lean angle detector arranged to detect an absolute lean angle which is an angle of the vehicle body leaning sideways relative to a direction of gravity, a rotation angle detector arranged to detect a rotation angle of the balancer member relative to the vehicle body, and a controller programmed to control the drive mechanism based on results of detection by the lean angle detector and the rotation angle detector.

According to a preferred embodiment of the present invention, the balancer member is arranged to support the right wheel and left wheel to be movable up and down in substantially equal amounts in opposite directions. This enables the vehicle to make turns by leaning the vehicle body while maintaining both the right and left wheels in contact with the traveling surface. The rotation angle detector is arranged to detect a rotation angle of the balancer member relative to the vehicle body. This rotation angle is in a corresponding relationship with an angle of the vehicle body leaning sideways relative to the traveling surface (relative lean angle). Thus, based on the absolute lean angle and the rotation angle described above, the controller can properly acquire a positional relationship between the vehicle body (strictly, the up-and-down direction of the vehicle body), traveling surface and the direction of gravity, in other words, a running state of the saddle riding type vehicle. The controller can therefore rotate the headlight according to the running state of the saddle riding type vehicle to illuminate the direction of movement properly.

In a preferred embodiment of the present invention, it is preferable that the controller is arranged to prevent rotation of the headlight relative to the vehicle body when a difference between the absolute lean angle and the rotation angle has at least a predetermined value. The rotation angle detected by the rotation angle detector has a value corresponding to the relative lean angle. Thus, the difference between the rotation angle and absolute lean angle becomes the smaller, the more horizontal the traveling surface is, and increases with the gradient of the traveling surface. The controller carries out controls so as not to rotate the headlight when the difference between the absolute lean angle and rotation angle has at least a predetermined value. Consequently, even when the gradient of the traveling surface is relatively large, the headlight can conveniently illuminate an area forward of the saddle riding type vehicle.

In a preferred embodiment of the present invention, it is preferable that the controller is programmed to control the drive mechanism to return the headlight to a neutral position relative to the vehicle body when the headlight is away from the neutral position and a difference between the absolute lean angle and the rotation angle reaches at least a predetermined value. When the difference between the absolute lean angle and the rotation angle reaches at least the predetermined value, the controller returns the headlight to the neutral position. Consequently, even when the gradient of the traveling surface changes to more than a predetermined degree, the headlight can conveniently illuminate an area forward of the saddle riding type vehicle.

In a preferred embodiment of the present invention, it is preferable that the controller is programmed to calculate a relative lean angle which is an angle of the vehicle body leaning sideways relative to a traveling surface, based on the result of detection by the rotation angle detector, and to prevent rotation of the headlight relative to the vehicle body when a difference between the relative lean angle calculated and the absolute lean angle has at least a predetermined value. The smaller the difference between the relative lean angle and absolute lean angle, the more horizontal the traveling surface is, and increases with the gradient of the traveling surface. The controller carries out control so as not to rotate the headlight when the difference between the absolute lean angle and relative lean angle has at least a predetermined value. Consequently, even when the gradient of the traveling surface is relatively large, the headlight can conveniently illuminate an area forward of the saddle riding type vehicle.

In a preferred embodiment of the present invention, it is preferable that the controller is programmed to calculate a relative lean angle which is an angle of the vehicle body leaning sideways relative to a traveling surface, based on the result of detection by the rotation angle detector, and to control the drive mechanism to return the headlight to a neutral position relative to the vehicle body when the headlight is away from the neutral position and a difference between the relative lean angle and the absolute lean angle reaches at least a predetermined value. When the difference between the absolute lean angle and the relative lean angle reaches at least the predetermined value, the controller returns the headlight to the neutral position. Consequently, even when the gradient of the traveling surface changes to be more than a predetermined degree, the headlight can conveniently illuminate an area forward of the saddle riding type vehicle.

In a preferred embodiment of the present invention, it is preferable that the controller is programmed to cause, when rotating the headlight, an amount of rotation of the headlight relative to the vehicle body to correspond to one of the rotation angle and the absolute lean angle. By causing the amount of rotation of the headlight relative to the vehicle body to correspond to the rotation angle or absolute lean angle, the headlight can conveniently illuminate forward of the saddle riding type vehicle. The description of the step of "causing the amount of rotation of the headlight relative to the vehicle body to correspond to the rotation angle or absolute lean angle" includes a case of causing the amount of rotation of the headlight to coincide with the rotation angle/absolute lean angle, and a case of causing the amount of rotation of the headlight to coincide with a value corresponding to the rotation angle/absolute lean angle (e.g., relative lean angle calculated from the rotation angle).

In a preferred embodiment of the present invention, it is preferable that the headlight is rotatably supported by one of the vehicle body and the balancer member. Then, the headlight can be installed easily and conveniently. In this case, the drive mechanism rotates the headlight relative to the vehicle body or balancer member. The controller can easily calculate an amount of drive by the drive mechanism (control amount). The controller can therefore control the amount of rotation of the headlight simply.

According to yet another preferred embodiment of the present invention, a vehicle includes a controller programmed to cause the amount of rotation of the headlight relative to the vehicle body to substantially coincide with the relative lean angle.

As a result, a positional relationship between a range of illumination by the headlight and the traveling surface can be maintained constant.

According to a further preferred embodiment of the present invention, a vehicle includes a drive mechanism arranged to rotate the headlight relative to the vehicle body.

As a result, the controller can simply calculate an amount of rotation of the headlight by the drive mechanism.

According to yet another preferred embodiment of the present invention, a vehicle includes a drive mechanism that is arranged to rotate the headlight relative to the balancer member.

Accordingly, the controller can simply calculate an amount of rotation of the headlight by the drive mechanism.

Other elements, features, steps, characteristics and advantages of the present invention will become more apparent from the following detailed description of the preferred embodiments with reference to the attached drawings.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DETAILED DESCRIPTION OF PREFERRED EMBODIMENTS

Preferred embodiments of the present invention will be described in detail hereinafter with reference to the drawings.

Preferred Embodiment 1

Figure 1:
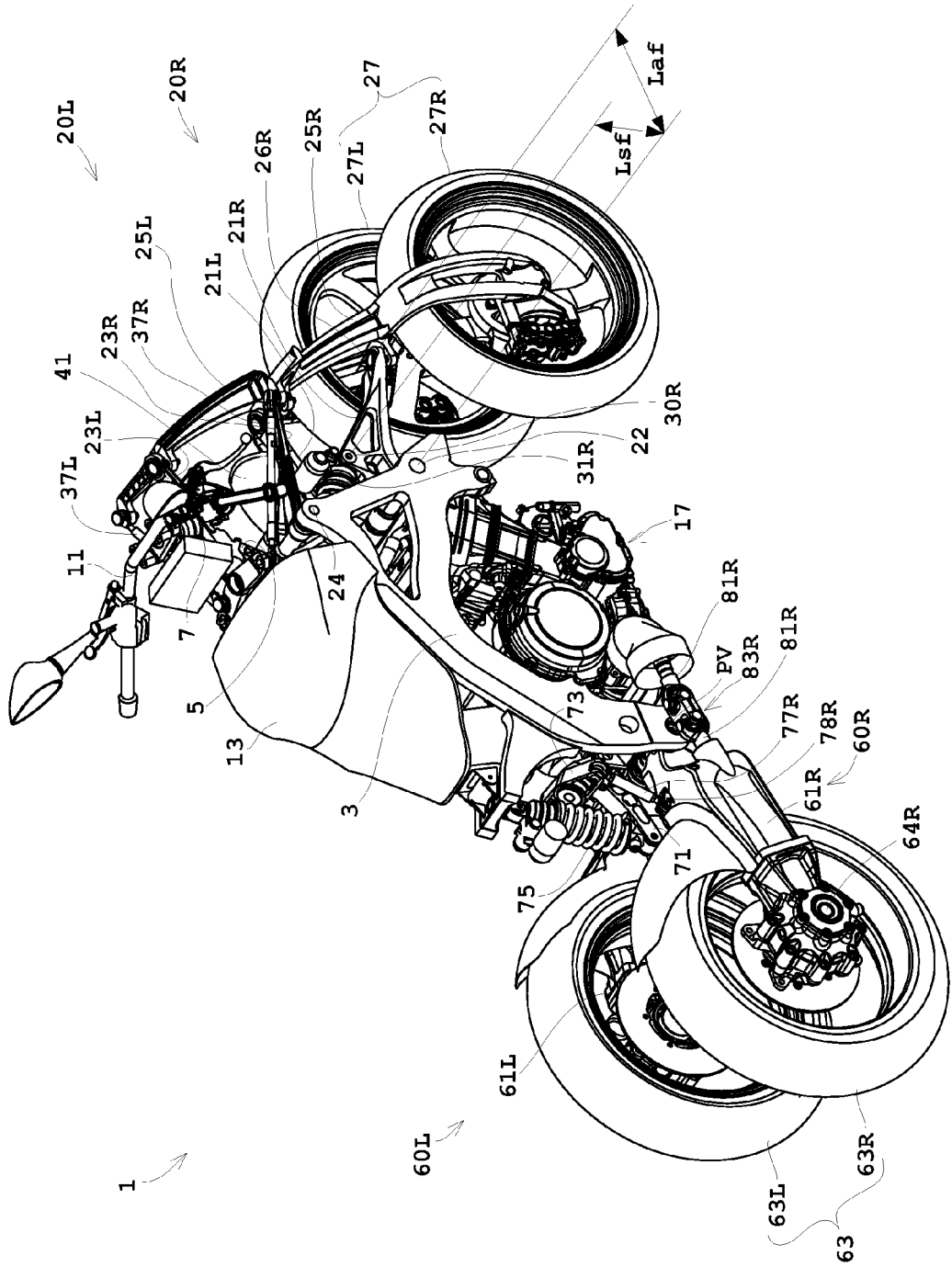
FIG. 1 is a perspective view showing an outline construction of a saddle riding type vehicle according to Preferred Embodiment 1 of the present invention.
Figure 2:
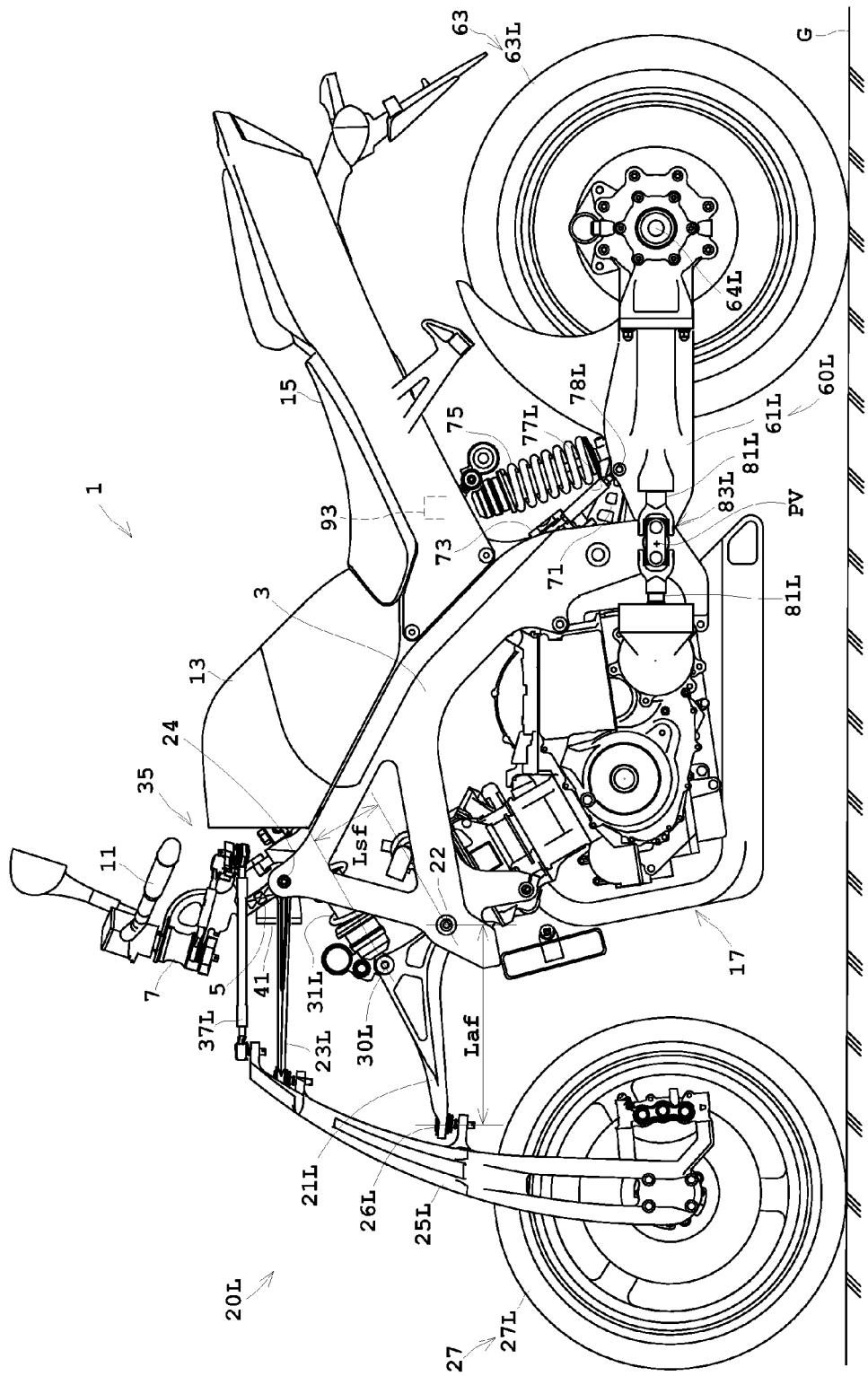
FIG. 2 is a side view showing an outward appearance of the saddle riding type vehicle according to Preferred Embodiment 1 of the present invention.
Figure 3:
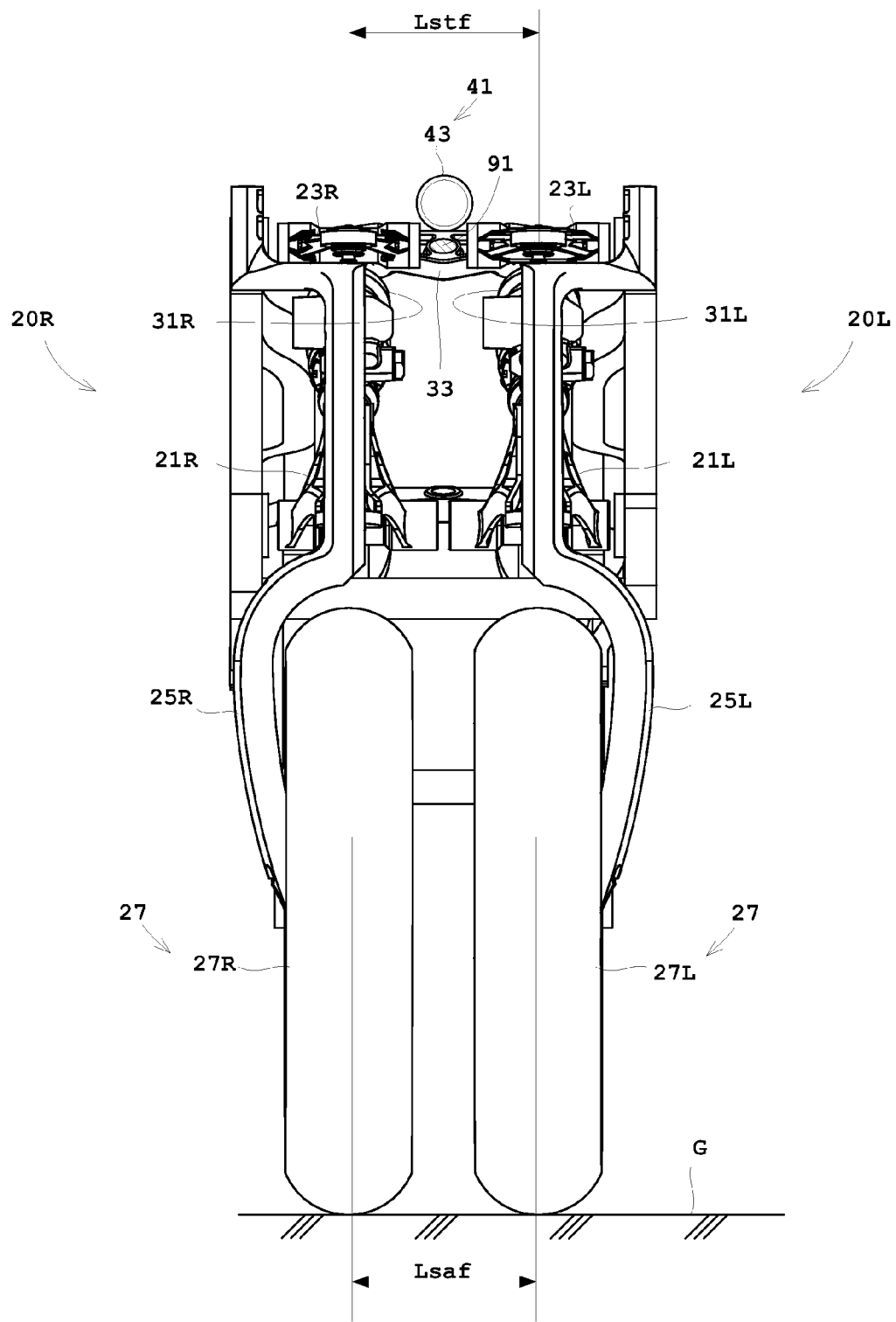
FIG. 3 is a front view of the saddle riding type vehicle according to Preferred Embodiment 1 of the present invention.

FIG. 1 is a perspective view showing an outline construction of a saddle riding type vehicle according to Preferred Embodiment 1. FIG. 2 is a side view showing an outward appearance of the saddle riding type vehicle. FIG. 3 is a front view of the saddle riding type vehicle. A seat shown in FIG. 2 is omitted from FIG. 1. A handlebar, a main frame and so on shown in FIGS. 1 and 2 are omitted from FIG. 3. In the following description, the simple terms "right" and "left" refer to the sides seen from the rider seated on the saddle riding type vehicle 1. In FIG. 2, the left side of the drawing corresponds to the front of the saddle riding type vehicle 1, and right side of the drawing corresponds to the rear of the saddle riding type vehicle 1.

The saddle riding type vehicle 1 in this preferred embodiment preferably is a four-wheeled automotive vehicle including pairs of wheels at the front and rear of a vehicle body, respectively. The saddle riding type vehicle 1 includes a main frame 3 around the center of the vehicle body. A head pipe 7 is attached to the front (right in FIG. 1 and left in FIG. 2) of the main frame 3 through a support frame 5. The head pipe 7 has a handlebar 11 mounted thereon. A fuel tank 13 is mounted on an upper forward portion of the main frame 3, and a seat 15 is mounted rearward of the fuel tank 13. An engine 17 is mounted in a lower position of the main frame 3 below the fuel tank 13.

In the following description, this main frame 3 and components (e.g., the seat 15) rigidly secured to the main frame 11 will be referred to as the "vehicle body" where appropriate.

Construction Relating to the Front Wheels

1. Support Mechanism

Referring to FIGS. 1 and 2, the main frame 3 has, attached to lower front positions thereof, a lower right arm 21R and a lower left arm 21L arranged transversely and extending forward of the vehicle body. Each of the lower right arm 21R and lower left arm 21L is supported by the main frame 3 to be rotatable about a lower pivot shaft 22. The main frame 3 includes, attached to upper front positions thereof, an upper right arm 23R and an upper left arm 23L arranged transversely and extending forward of the vehicle body. Each of the upper right arm 23R and upper left arm 23L is supported by the main frame 3 to be rotatable about an upper pivot shaft 24.

The other end of the lower right arm 21R is connected to a right knuckle arm 25R at a connecting point 26R. The right knuckle arm 25R extends obliquely upward, and is in a substantially middle position thereof connected to the other end of the upper right arm 23R. A right wheel 27R is rotatably supported by a lower portion of the right knuckle arm 25R. The joint at which the right knuckle arm 25R is connected to the upper right arm 23R, and positions of the lower pivot shaft 22, upper pivot shaft 24 and connecting point 26R, are arranged substantially to correspond to the vertexes of a parallelogram in a side view thereof.

Similarly, a left knuckle arm 25L is interlocked to the lower left arm 21L and upper left arm 23L, with the left knuckle arm 25L supporting a left wheel 27L. The lower left arm 21L and left knuckle arm 25L are connected at a connecting point 26L. The right wheel 27R and left wheel 27L are opposed to each other across the vehicle body.

With the lower right arm 21R and upper right arm 23R rotating in forward and reverse directions about the lower pivot shaft 22 and upper pivot shaft 24, respectively, the right knuckle arm 25R moves substantially up and down along the vehicle body. Consequently, the right wheel 27R moves up and down relative to the vehicle body. Similarly, with the lower left arm 21L and upper left arm 23L and left knuckle arm 25L moving as interlocked to one another, the left wheel 27L moves up and down relative to the vehicle body.

The right wheel 27R and left wheel 27L will be called collectively hereinafter the "right and left wheels 27" where appropriate. The right and left wheels 27 correspond to the "pair of front wheels" according to a preferred embodiment of the present invention.

The lower right arm 21R is interlocked to a right shock absorber 31R at a connecting point 30R (see FIG. 1). The lower left arm 21L is interlocked to a left shock absorber 31L at a connecting point 30L (see FIG. 2). The other ends of the right shock absorber 31R and left shock absorber 31L are interlocked to opposite ends of a balance beam 33, respectively (see FIG. 3). The balance beam 33 is supported by the main frame 3 to be rotatable about a shaft located in a middle position of the balance beam 33.

For example, the right lower arm 21R rotates about the lower pivot shaft 22 to lower the right wheel 27R. At this time, the right lower arm 21R pulls down one end of the balance beam 33 through the right shock absorber 31R. This rotates the balance beam 33 to pull up the left lower arm 21L through the left shock absorber 31L connected to the other end. As a result, the left wheel 27L moves up by an amount corresponding to the descent of the right wheel 27R. Thus, the balance beam 33 causes the right wheel 27R and left wheel 27L to move up and down in opposite directions. The right wheel 27R and left wheel 27L move up and down in substantially equal amounts in substantially opposite directions relative to the vehicle body.

The term "substantially equal amounts" noted above includes not only a case where amounts of up-and-down movement of the right wheel 27R and left wheel 27L are strictly equal, but also cases where the amounts are approximately equal. The cases of being approximately equal include, for example, a case where a difference occurs between the amounts of up-and-down movement of the right wheel 27R and left wheel 27L, which is due to play of a connection between members such as the balance beam 33 and lower right arm 21R, deflection or deformation of each member itself, or surface configurations or the like of the right and left wheels 27 which directly contact traveling surface G.

The lower right arm 21R, upper right arm 23R, right knuckle arm 25R and right shock absorber 31R noted above constitute a front right side support mechanism 20R. Similarly, the lower left arm 21L, upper left arm 23L, left knuckle arm 25L and left shock absorber 31L constitute a front left side support mechanism 20L. The balance beam 33 corresponds to the "balancer member" and "front balancer member" according to a preferred embodiment of the present invention.

2. Steering Mechanism

Reference is made to FIGS. 1 and 2. A steering link mechanism 35 is interlocked to a lower portion of the handlebar 11 noted above (see FIG. 1). A right steering rod 37R and a left steering rod 37L are connected to the steering link mechanism 35. The other end of the right steering rod 37R is interlocked to an upper portion of the right knuckle arm 25R. The other end of the left steering rod 37L is interlocked to the left knuckle arm 25L. In response to operation of the handlebar 11, the right knuckle arm 25R and left knuckle arm 25L rotate about vertical axes, respectively, to give steering angles to the right and left wheels 27.

Headlight

As shown in FIGS. 1, 2 and 3, a headlight unit 41 is mounted on the balance beam 33. The headlight unit 41 illuminates an area ahead of the saddle riding type vehicle 1.

Figure 4:
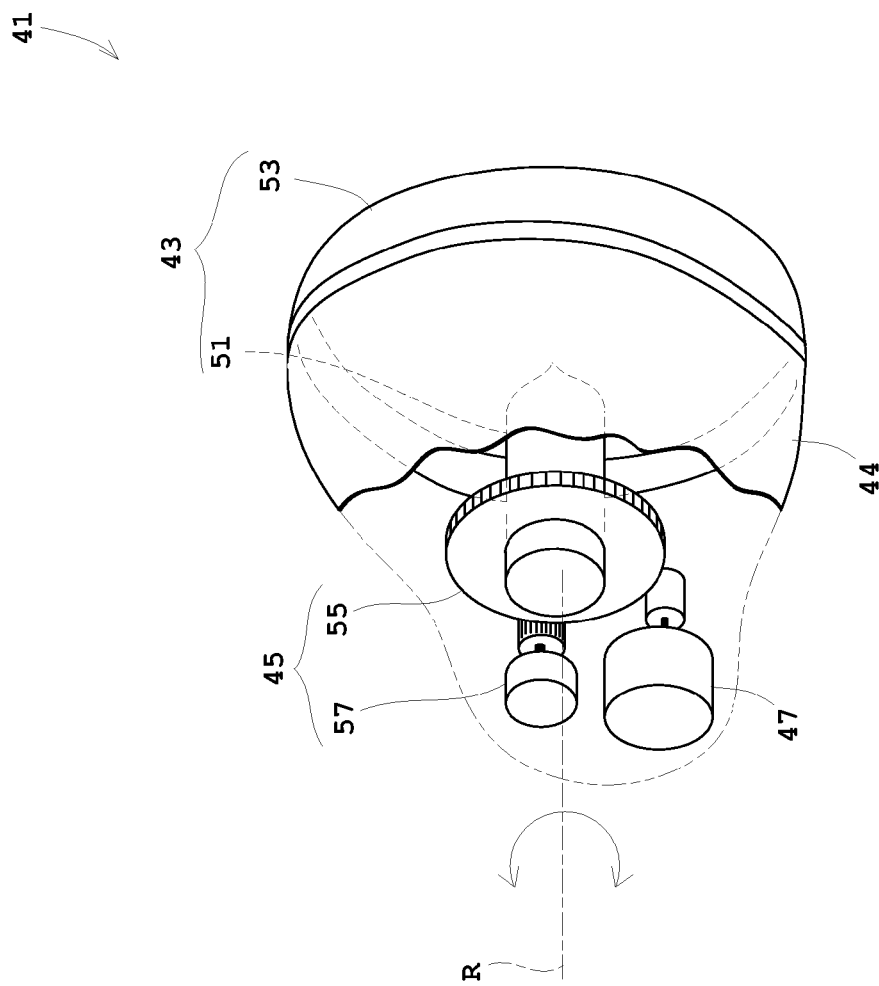
FIG. 4 is a detailed view of a headlight unit.

Reference is made to FIG. 4. FIG. 4 is a detailed view of the headlight unit 41. The headlight unit 41 may preferably have a construction similar to a conventional headlight unit, for example. This headlight unit 41 includes a headlight 43, a housing 44, a drive mechanism 45 and a potentiometer 47. The headlight 43 is supported by the housing 44 to be rotatable about an optical axis R. The housing 44 is fixed to the balance beam 33. The headlight 43 includes a bulb 51 and a lens 53. The drive mechanism 45 rotates the headlight 43 about the optical axis R relative to the balance beam 33. This drive mechanism 45 includes a ring gear 55 fixed to the bulb 51, and a motor 57 meshed with the ring gear 55. The potentiometer 47 detects an amount of rotation θM of the headlight 43. The potentiometer 47 is meshed with the ring gear 55 to detect the amount of rotation θM based on an amount of rotation of the ring gear 55. Thus, the above amount of rotation θM is an amount the headlight 43 is rotated by the drive mechanism 45 relative to the balance beam 33.

In this way, the headlight 43 is rotatably supported by the balance beam 33. With the motor 57 rotating the ring gear 55, the headlight 43 rotates about the optical axis R relative to the balance beam 33, and the potentiometer 47 detects the amount of rotation θM of the headlight 43.

Figure 5A:
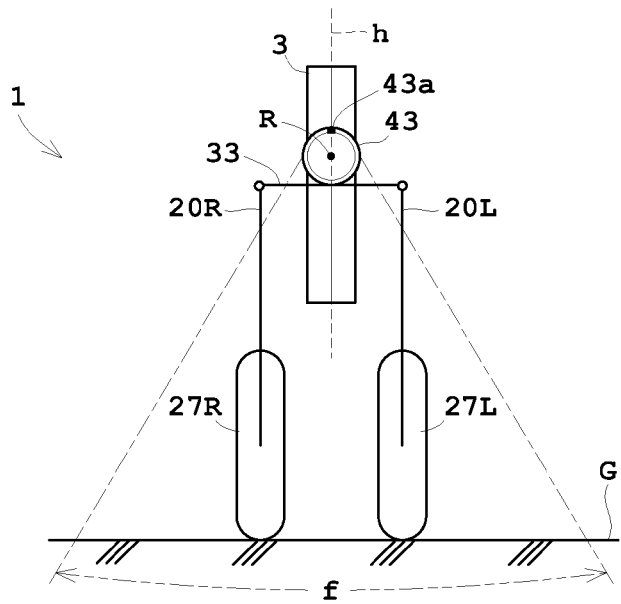
FIG. 5A is a view schematically showing a relationship between rotation of a headlight and illumination range of the headlight.
Figure 5B:
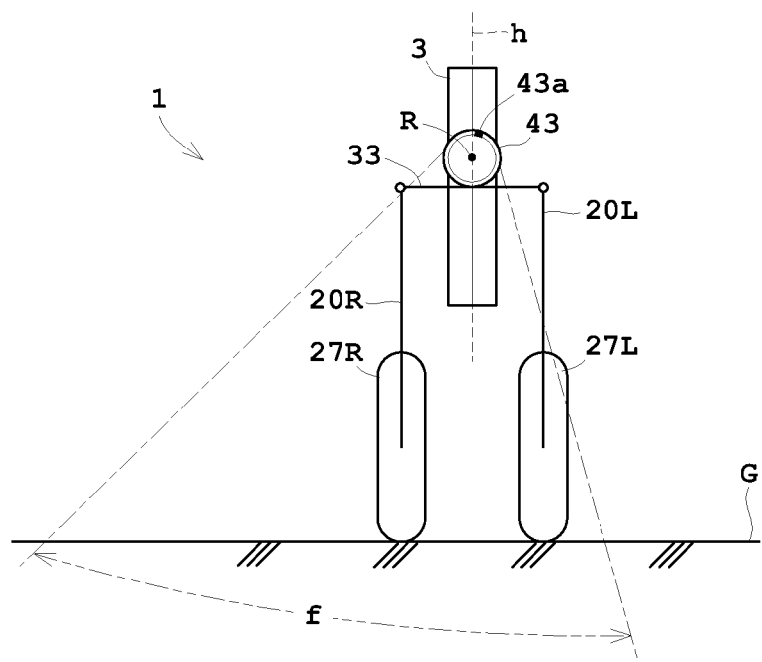
FIG. 5B is a view schematically showing a relationship between rotation of the headlight and illumination range of the headlight.

Reference is made to FIGS. 5A and 5B. FIGS. 5A and 5B are views schematically showing a relationship between rotation of the headlight and illumination range of the headlight. FIGS. 5A and 5B schematically shows the saddle riding type vehicle 1 running on a traveling surface G toward the plane of the figures. In FIGS. 5A and 5B, the optical axis R extends perpendicular to the plane of the figures. In FIGS. 5A and 5B, sign "h" indicates the up-and-down direction of the vehicle body. In FIGS. 5A and 5B, range f schematically shows the illumination range of the headlight 43. FIGS. 5A and 5B show mark 43a, for the purpose of convenience, to indicate an amount of rotation about the optical axis R of the headlight 43.

As is clear from the positions of mark 43a shown in FIGS. 5A and 5B, the position of the headlight 43 shown in FIG. 5B is a position to which the headlight 43 shown in FIG. 5A is rotated. As is clear from illumination ranges f shown in FIGS. 5A and 5B, the headlight 43 in FIG. 5A illuminates center forward of the saddle riding type vehicle 1, while the headlight 43 in FIG. 5b illuminates right forward of the saddle riding type vehicle 1. Thus, with rotation of the headlight 43, the illumination range of the headlight 43 is movable between right forward and left forward of the saddle riding type vehicle 1. The "neutral position" to be described below with respect to Preferred Embodiment 2 refers to the position of the headlight 43 relative to the vehicle body (main frame 3) shown in FIG. 5A.

Construction Relating to the Rear Wheels

1. Support Mechanism

Reference is made to FIGS. 1 and 2. The main frame 3 includes, attached to lower rear positions thereof, a right rear arm 61R and a left rear arm 61L arranged transversely and extending rearward of the vehicle body. The right rear arm 61R and left rear arm 61L are supported by the main frame 3 to be rotatable about pivot shafts PV, respectively. The right rear arm 61R rotatably supports a right wheel 63R at a rear end thereof. The left rear arm 61L rotatably supports a left wheel 63L at a rear end thereof. The right rear arm 61R and right wheel 63R are connected at a connecting point 64R. The left rear arm 61L and left wheel 63L are connected at a connecting point 64L. The right wheel 63R and left wheel 63L are opposed to each other across the vehicle body.

When the right wheel 63R moves up and down relative to the vehicle body, the right rear arm 61R will rotate in opposite directions about the pivot shaft PV. Similarly, up-and-down movements of the left wheel 63L are interlocked to rocking of the left rear arm 61L.

The right wheel 63R and left wheel 63L will be called collectively hereinafter the "right and left wheels 63" where appropriate. The right and left wheels 63 correspond to the "pair of rear wheels" according to a preferred embodiment of the present invention.

Reference is made to FIG. 1. A carrier beam 71 is connected to the main frame 3 between the right rear arm 61R and left rear arm 61L. The carrier beam 71 rotatably holds a stabilizer 73. Further, a shock absorber 75 is interlocked to a forward end of the carrier beam 71. The other end of the shock absorber 75 is interlocked to the main frame 3. A right rod 77R and a left rod 77L are interlocked to opposite ends of the stabilizer 73, respectively (see FIG. 2 for the left rod 77L). The other end of the right rod 77R is interlocked to the right rear arm 61R at a connecting point 78R. The other end of the left rod 77L is interlocked to the left rear arm 61L at a connecting point 78L.

When, for example, the right rear arm 61R rotates about the pivot shaft PV with lowering of the right wheel 63R, the right rear arm 61R pulls down one end of the stabilizer 73 through the right rod 77R. This rotates the stabilizer 73 to pull up the left rear arm 61L through the left rod 77L connected to the other end. As a result, the left wheel 63L moves up by an amount corresponding to the descent of the right wheel 63R. Thus, the stabilizer 73 causes the right wheel 63R and left wheel 63L to move up and down in opposite directions. The right wheel 63R and left wheel 63L move up and down in substantially equal amounts in substantially opposite directions relative to the vehicle body.

The term "substantially equal amounts" noted above includes not only a case where amounts of up-and-down movement of the right wheel 63R and left wheel 63L are strictly equal, but also cases where the amounts are approximately equal.

The right rear arm 61R and right rod 77R constitute a right side support mechanism 60R. The left rear arm 61L and left rod 77L constitute a left side support mechanism 60L.

The stabilizer 73 corresponds to the "balancer member" and "rear balancer member" according to a preferred embodiment of the present invention.

2. Driving Device

Reference is made to FIGS. 1 and 2. The engine 17 outputs a driving force to a pair of right and left drive shafts 81R and 81L through a bevel gear (not shown). The drive shaft 81R has a double cardon type joint 83R disposed in an intermediate position thereof. A rear portion of the drive shaft 81R is rotatably held by the right rear arm 61R through a bearing (not shown). The drive shaft 81R has a different bevel gear (not shown) provided at a rear end thereof, and the rear wheel 83R is connected to this bevel gear. The drive shaft 81L is similar in construction to the drive shaft 81R.

Detector

As shown in FIG. 3, a front detector 91 is provided for the rotary shaft through which the balance beam 33 is supported by the main frame 3. The front detector 91 detects rotation angle θf the balance beam 33 relative to the vehicle body (strictly speaking, the up-and-down direction h of the vehicle body). The front detector 91 preferably includes a potentiometer, for example. The front detector 91 corresponds to the "detector", "front detector" and "rotation angle detector" according to a preferred embodiment of the present invention.

Controller

Figure 6:
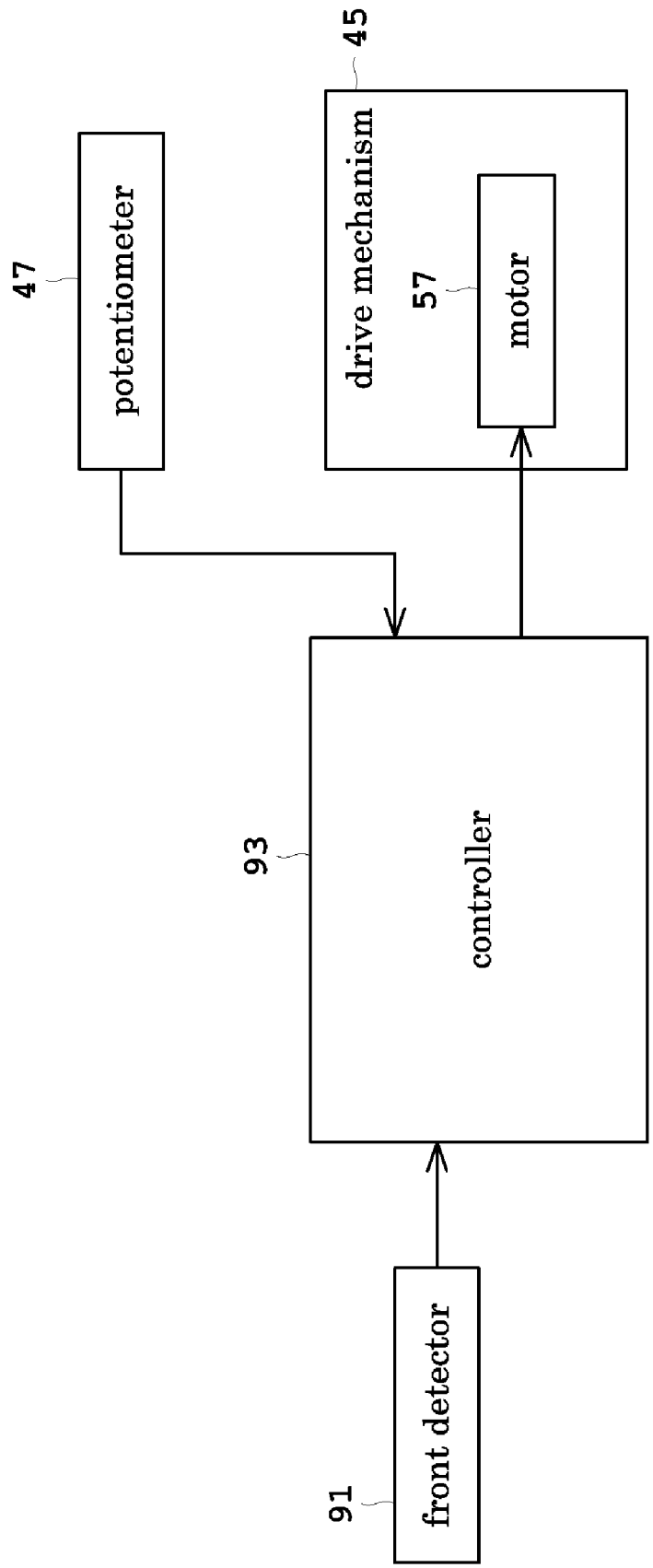
FIG. 6 is a block diagram showing an outline construction of a control system provided for the saddle riding type vehicle.

Reference is made to FIG. 6. FIG. 6 is a block diagram showing an outline construction of a control system provided for the saddle riding type vehicle 1. A controller 93 receives detection results from the front detector 91 and potentiometer 47. The controller 93 derives a relative lean angle θR from rotation angle θf provided by the front detector 91. The relative lean angle θR is a lean angle of the vehicle body leaning right or left relative to the traveling surface G. In other words, the relative lean angle θR is an angle formed between the up-and-down direction h of the vehicle body and a direction perpendicular to the traveling surface G. When determining this relative lean angle θR, the controller 93 uses a suspension lever ratio Rsaf and a connection lever ratio Rstf.

The suspension lever ratio Rsaf and connection lever ratio Rstf will be described now. The suspension lever ratio Rsaf is a ratio between rocking radius Laf and rocking radius Lsf as shown in the following equation (1):

$$Rsaf=Laf/Lsf \qquad (1)$$

Rocking radius Laf is, as shown in FIG. 1 or 2, a rocking radius of the right wheel 27R provided by the front right side support mechanism 20R, and also a rocking radius of the left wheel 27L provided by the front left side support mechanism 20L. The rocking radius of the right wheel 27R provided by the front right side support mechanism 20R and the rocking radius of the left wheel 27L provided by the front left side support mechanism 20L take the same value. Therefore, the value of one of the rocking radii may be used as rocking radius Laf.

Rocking radius Lsf is a rocking radius of the balance beam 33 provided by the front right side support mechanism 20R, and also a rocking radius of the balance beam 33 provided by the front left side support mechanism 20L. In this case also, the rocking radius of the balance beam 33 provided by the front right side support mechanism 20R and the rocking radius of the balance beam 33 provided by the front left side support mechanism 20L preferably have the same value. Therefore, the value of one of the rocking radii may be used as rocking radius Lsf.

Connection lever ratio Rstf is a ratio between spacing distance Lstf and spacing distance Lsaf as shown in the following equation (2):

$$Rstf=Lstf/Lsaf \qquad (2)$$

As shown in FIG. 3, spacing distance Lstf is a space between connecting positions where the front right side support mechanism 20R and front left side support mechanism 20L are connected to the balance beam 33, respectively.

Spacing distance Lsaf is a space between a connecting position where the front right side support mechanism 20R is connected to the right wheel 27R and a connecting position where the front left side support mechanism 20L is connected to the left wheel 27L.

Using the above suspension lever ratio Rsaf and connection lever ratio Rstf, rotation angle θf and relative lean angle θR are in a relationship shown in the following equation (3):

$$\theta R=\theta f \cdot Rsaf \cdot Rstf \qquad (3)$$

That is, relative lean angle θR is equal to a value of rotation angle θf multiplied by suspension lever ratio Rsaf and connection lever ratio Rstf.

The controller 93 controls the drive mechanism 45 based on the relative lean angle θR obtained in this way. Specifically, the drive mechanism 45 is controlled so that an amount of rotation θH of the headlight 43 relative to the vehicle body may coincide with relative lean angle θR. Here, the amount of rotation θH of the headlight 43 relative to the vehicle body is a sum of rotation angle θf the balance beam 33 relative to the vehicle body and amount of rotation θM of the headlight 43 relative to the balance beam 33. Thus, the controller 93 uses a sum of rotation angle θf obtained by the front detector 91 and amount of rotation θM detected by the potentiometer 47, as amount of rotation θH of the headlight 43 relative to the vehicle body.

The controller 93 preferably includes a central processing unit (CPU) programmed to perform the above-described arithmetic process and various other processes and a storage medium, or a microcomputer. The storage medium has, stored beforehand therein, values of suspension lever ratio Rsaf and connection lever ratio Rstf corresponding to the right and left wheels 27, front right side support mechanism 20R, front left side support mechanism 20L and balance beam 33.

Next, an example of operation of the saddle riding type vehicle 1 in Preferred Embodiment 1 will be described. In order to illustrate the characteristic of Preferred Embodiment 1 clearly, it is assumed in this example of operation that the balance beam 33 is not maintained parallel to the traveling surface G when the vehicle body leans relative to the traveling surface G. In other words, when the relative lean angle θR varies, the variations in the relative lean angle θR and variations in the rotation angle θf will not become equal.

The controller 93 derives relative lean angle θR from a result of detection by the front detector 91, and controls the drive mechanism 45 based on the relative lean angle θR derived and a result of detection by the potentiometer 47. This rotates the headlight 43 by the amount of rotation θM relative to the balance beam 33. As a result, the amount of rotation θH of the headlight 43 relative to the vehicle body coincides with the relative lean angle θR.

Figure 7:
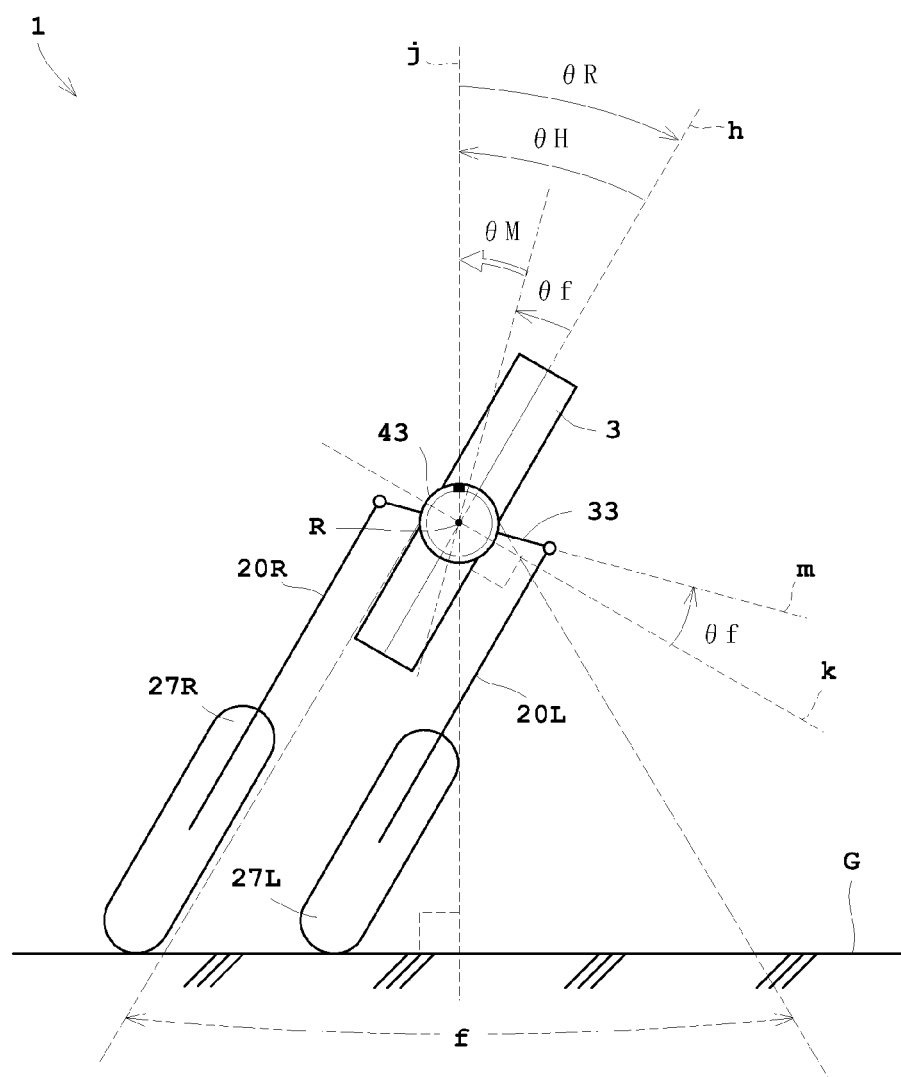
FIG. 7 is a simplified front view of the saddle riding type vehicle with the vehicle body leaning relative to a traveling surface.

Reference is made to FIG. 7. FIG. 7 is a simplified front view of the saddle riding type vehicle 1 with the vehicle body leaning relative to the traveling surface G. FIG. 7 schematically shows the saddle riding type vehicle 1 running on the traveling surface G toward the plane of the figure, and turning left as seen from the rider. In this figure, sign "h" denotes the up-and-down direction of the vehicle body. Axis j is vertical to the traveling surface G. Axis k is perpendicular to the up-and-down direction h of the vehicle body. Axis m represents an inclination of the balance beam 33. This axis m corresponds to an axis linking the two connecting positions where the right shock absorber 31R and left shock absorber 31L are connected to the balance beam 33. Therefore, axis m becomes parallel to axis k when the up-and-down direction h of the vehicle body is parallel to axis j vertical to the traveling surface G (that is, when the relative lean angle θR is 0). Range f schematically shows the illumination range of the headlight 43.

As shown in FIG. 7, the up-and-down direction h of the vehicle body is leaning left at relative lean angle θR (θR≠0) to the traveling surface G. The right wheel 27R is lowered relative to the vehicle body, while the left wheel 27L is raised relative to the vehicle body. The left wheel 27L and right wheel 27R are moved up and moved down in the same amount. The balance beam 33 is rotated by rotation angle θf (θf≠θR) relative to the vehicle body.

At this time, the headlight 43 is rotated with this balance beam 33 by the same angle as rotation angle θf, relative to the vehicle body, and is further rotated by the amount of rotation θM relative to the balance beam 33 by the drive mechanism 45 under control of the controller 93. As a result, a sum of rotation angle θf and amount of rotation θM, i.e. the amount of rotation θH of the headlight 43 relative to the vehicle body, becomes equal to relative lean angle θR.

Therefore, as seen, the illumination range f of the headlight 43 is a left forward portion of the traveling surface G in the turning direction of the saddle riding type vehicle 1.

As described above, the saddle riding type vehicle 1 according to Preferred Embodiment 1 includes the balance beam 33 arranged to cause the right and left wheels 27 to move up and down in substantially equal amounts in opposite directions. This enables the vehicle 1 to make turns by leaning the vehicle body while maintaining both the right and left wheels 27 in contact with the traveling surface G.

Since rotation angle θf detected by the front detector 91 is in a corresponding relationship with relative lean angle θR, the controller 93 can easily calculate relative lean angle θR from rotation angle θf.

Especially, the controller 93 can convert rotation angle θf to relative lean angle θR accurately by using suspension lever ratio Rsaf and connection lever ratio Rstf.

The controller 93 controls the drive mechanism 45 to cause the amount of rotation θH of the headlight 43 relative to the vehicle body to be equal to relative lean angle θR. Consequently, the headlight 43 can illuminate an area of the traveling direction properly.

The front detector 91, which is arranged to detect rotation angles between the vehicle body and balance beam 33 rotatably interconnected, can be simple in construction. As a result, compared with the case of using a relatively expensive lean sensor, the manufacturing cost of the saddle riding type vehicle 1 can be significantly reduced.

Since the drive mechanism 45 and controller 93 are provided and arranged to rotate the headlight 43, the balance beam 33 need not be maintained parallel to the traveling surface G as described in the above example of operation. This feature allows a relatively high degree of freedom in structure, size and arrangement for the balance beam 33, and for the front right side support mechanism 20R and front left side support mechanism 20L linked to the balance beam 33.

The balance beam 33 is not limited to the above example of operation. That is, the balance beam 33 may be installed such that the balance beam 33 is maintained parallel to the traveling surface G even when the vehicle body leans relative to the traveling surface G. Even with such balance beam 33, the headlight 43 can be rotated by the drive mechanism 45 and controller 93 to illuminate the traveling direction properly.

Since the drive mechanism 45 rotates the headlight 43 relative to the balance beam 33, the controller 93 can easily calculate an amount of drive (control amount) of the drive mechanism 45 to control the amount of rotation θH of the headlight 43 relative to the vehicle body. Therefore, the controller 93 can simply control the amount of rotation θH of the headlight 43 relative to the vehicle body.

Preferred Embodiment 2

Figure 8:
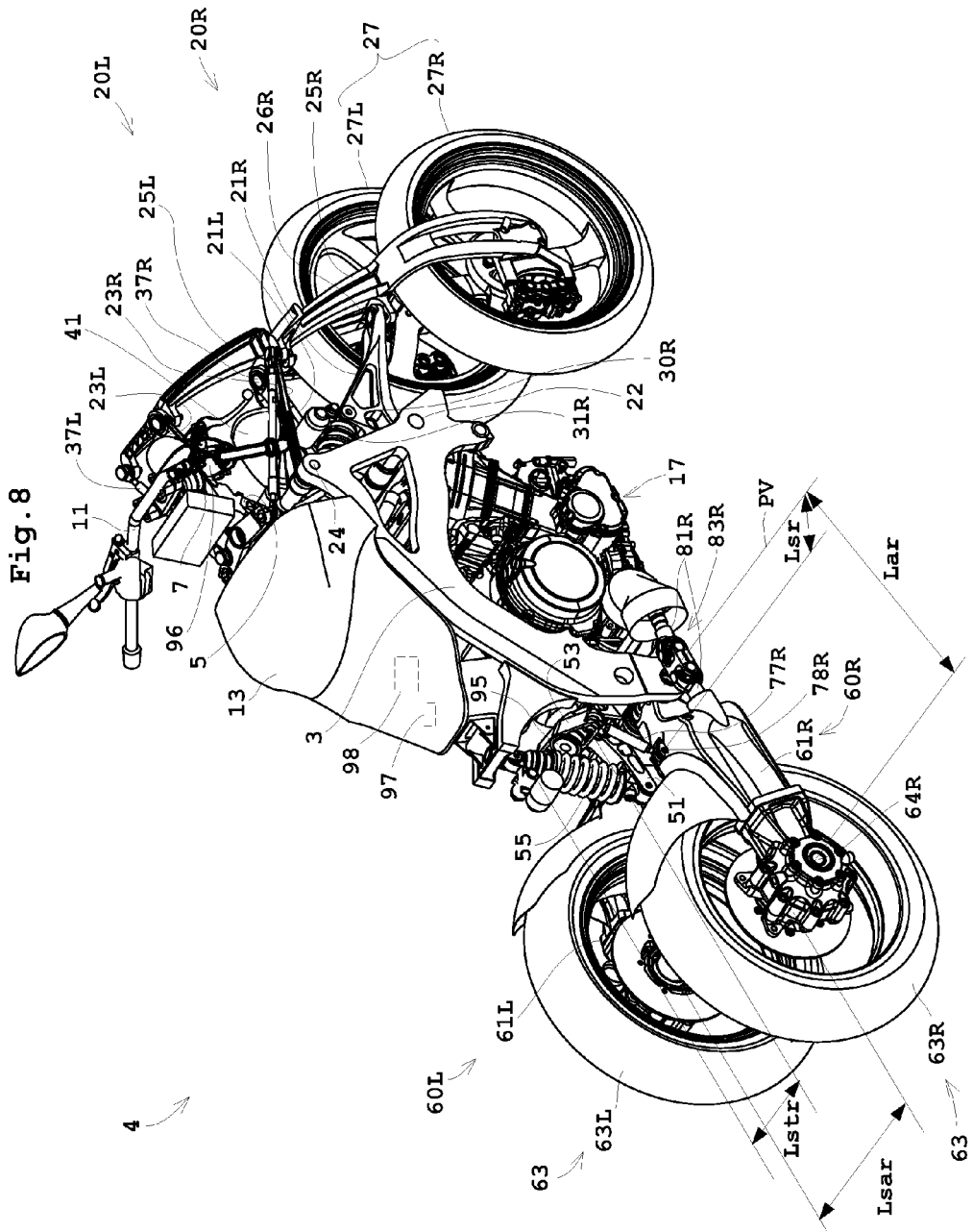
FIG. 8 is a perspective view showing an outline construction of a saddle riding type vehicle according to Preferred Embodiment of the present invention.

Preferred Embodiment 2 of the present invention will be described hereinafter with reference to the drawings. Components identical to those of Preferred Embodiment 1 are shown with the same reference numerals, and will not particularly be described. FIG. 8 is a perspective view showing an outline construction of a saddle riding type vehicle according to Preferred Embodiment 2.

In Preferred Embodiment 2, the headlight 43 is rotatably supported by the main frame 3. Specifically, the housing 44 is fixed to the main frame 3, and the drive mechanism 45 rotates the headlight 43 about the optical axis R relative to the main frame 3. The potentiometer 47 detects an amount of rotation of the headlight 43 provided by the drive mechanism 45. This amount of rotation corresponds to amount of rotation θH of the headlight 43 relative to the vehicle body (main frame 3).

The saddle riding type vehicle 4 in Preferred Embodiment 2 has a rear detector 95, a dimmer switch 96, a lean angle detector 97 and a controller 98.

As shown in FIG. 8, the rear detector 95 is provided for the rotary shaft through which the stabilizer 73 is supported by the main frame 3. The rear detector 95 detects rotation angle θr of the stabilizer 73 relative to the vehicle body (strictly speaking, the up-and-down direction h of the vehicle body). The rear detector 95 preferably includes a potentiometer, for example. The rear detector 95 corresponds to the "rear detector", "detector" and "rotation angle detector" according to a preferred embodiment of the present invention.

The dimmer switch 96 is a switch arranged to switch illumination of the headlight 43 upward (Hi) and downward (Lo). The dimmer switch 96 is attached to the handlebar 11 to be operable by the rider. The dimmer switch 96 outputs output signals corresponding to the switched states.

The lean angle detector 97 detects absolute lean angle θA which is an angle of the vehicle body (strictly speaking, the up-and-down direction h of the vehicle body) leaning right or left relative to the direction of gravity. The lean angle detector 97 preferably includes an acceleration sensor, for example. The lean angle detector 97 is preferably located adjacent the center of gravity of the saddle riding type vehicle 4. However, the location of the lean angle detector 97 is not limited to adjacent the center of gravity of the saddle riding type vehicle 4, but may be installed in any other appropriate position.

Figure 9:
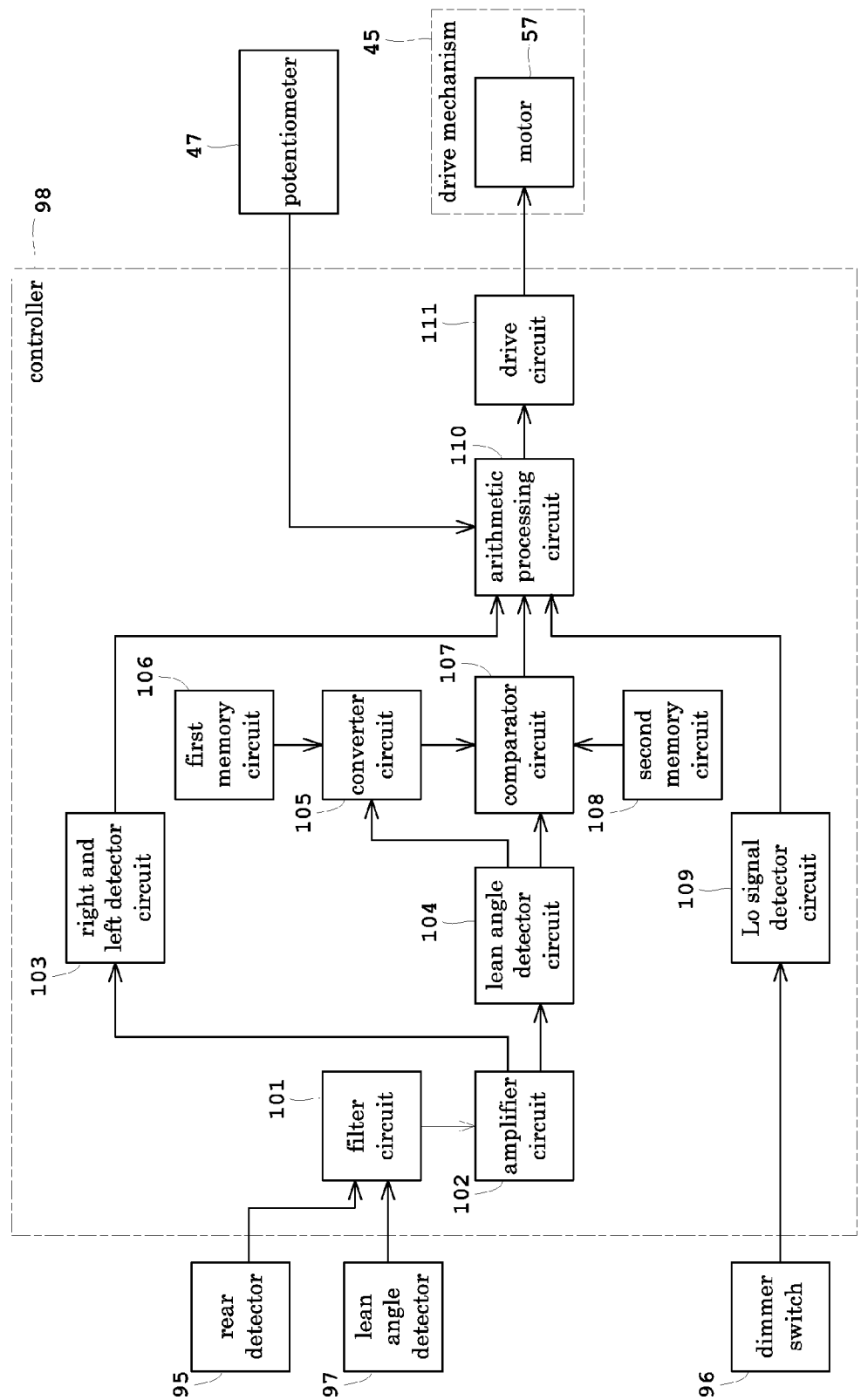
FIG. 9 is a block diagram showing an outline construction of a control system.

Reference is made to FIG. 9. FIG. 9 is a block diagram showing an outline construction of a control system provided for the saddle riding type vehicle 4. The controller 98 has, connected thereto, the rear detector 95, lean angle detector 97, potentiometer 47, dimmer switch 96 and drive mechanism 45 (motor 57). The controller 98 includes various circuits which are roughly divided into processing circuits and a drive circuit 111. The processing circuits preferably include a filter circuit 101, an amplifier circuit 102, a right and left detector circuit 103, a lean angle detector circuit 104, a converter circuit 105, a first memory circuit 106, a comparator circuit 107, a second memory circuit 108, a Lo signal detector circuit 109 and an arithmetic processing circuit 110.

The right and left detector circuit 103 is arranged to receive detection results from the lean angle detector 97 through the filter circuit 101 and amplifier circuit 102. Based on the detection results from the lean angle detector 97, the right and left detector circuit 103 determines whether the vehicle body is leaning right or left relative to the direction of gravity. The detector circuit 103 outputs (−) signal or (+) signal corresponding to left or right, to the arithmetic processing circuit 110.

The lean angle detector circuit 104 is arranged to receive detection results from the rear detector 95 and lean angle detector 97 through the filter circuit 101 and amplifier circuit 102. Based on the detection result from the rear detector 95, the lean angle detector circuit 104 detects rotation angle θr of the stabilizer 73 relative to the vehicle body. Based on the detection result from the lean angle detector 97, the lean angle detector circuit 104 detects absolute lean angle θA of the vehicle body leaning right or left relative to the direction of gravity.

The converter circuit 105 is connected to the output side of the lean angle detector circuit 104, and to the first memory circuit 106. The converter circuit 105 derives relative lean angle θR from rotation angle θr. Here, relative lean angle θR is a lean angle of the vehicle body leaning right or left relative to the traveling surface G. The first memory circuit 106 has, stored beforehand therein, values of suspension lever ratio Rsar and connection lever ratio Rstr corresponding to the right and left wheels 63, rear right side support mechanism 60R, rear left side support mechanism 60L and stabilizer 73. The converter circuit 105 converts rotation angle θr into relative lean angle θR using the suspension lever ratio Rsar and connection lever ratio Rstr. This process will be described in greater detail.

Suspension lever ratio Rsar is a ratio between rocking radius Lar and rocking radius Lsr as shown in the following equation (4):

$$Rsar = Lar/Lsr \quad (4)$$

As shown in FIG. 8, rocking radius Lar is a rocking radius of the right wheel 63R provided by the rear right side support mechanism 60R, and is also a rocking radius of the left wheel 63L provided by the rear left side support mechanism 60L. The rocking radius of the right wheel 63R and the rocking radius of the left wheel 63L preferably have the same value. Therefore, the value of one of the rocking radii may be used as rocking radius Lar.

Rocking radius Lsr is a rocking radius of the stabilizer 73 provided by the rear right side support mechanism 60R, and a rocking radius of the stabilizer 73 provided by the rear left side support mechanism 60L. In this case also, the rocking radius of the stabilizer 73 provided by the rear right side support mechanism 60R and the rocking radius of the stabilizer 73 provided by the rear left side support mechanism 60L preferably have the same value. Therefore, one of the rocking radii may be used as rocking radius Lsr.

Connection lever ratio Rstr is a ratio between spacing distance Lstr and spacing distance Lsar as shown in the following equation (5):

$$Rstr = Lstr/Lsar \quad (5)$$

As shown in FIG. 8, spacing distance Lstr is a space between connecting positions where the rear right side support mechanism 60R and rear left side support mechanism 60L are connected to the stabilizer 73.

Spacing distance Lsar is a space between a connecting position where the rear right side support mechanism 60R is connected to the right wheel 63R, and a connecting position where the rear left side support mechanism 60L is connected to the left wheel 63L.

Using these suspension lever ratio Rsar and connection lever ratio Rstr, rotation angle θr is converted into relative lean angle θR by the following equation (6):

$$\theta R = \theta r \cdot Rsar \cdot Rstr \quad (6)$$

The comparator circuit 107 is connected to the output sides of the lean angle detector circuit 104 and converter circuit 105 and to the second memory circuit 108. The second memory circuit 108 stores reference lean angle θ1 and reference angle θ2 set beforehand. The comparator circuit 107 compares reference lean angle θ1 and absolute lean angle θA, and determines whether or not absolute lean angle θA is equal to or larger than reference lean angle θ1. The comparator circuit 107 also compares a difference between relative lean angle θR and absolute lean angle θA with reference angle θ2, and determines whether or not the difference between relative lean angle θR and absolute lean angle θA is equal to or smaller than reference angle θ2.

The comparator circuit 107 outputs a signal to the arithmetic processing circuit 110 when absolute lean angle θA is equal to or larger than reference lean angle θ1 (condition 1) and the difference between relative lean angle θR and absolute lean angle θA is equal to or smaller than reference angle θ2 (condition 2). This signal is continuously outputted to the arithmetic processing circuit 110 until conditions 1 and 2 cease to be met. The comparator circuit 107 gives also information about absolute lean angle θA to the arithmetic processing circuit 110.

The Lo signal detector circuit 109 receives an output signal from the dimmer switch 96. Based on the output signal the Lo signal detector circuit 109 detects a direction of illumination switched upward (Hi) or downward (Lo) by the dimmer switch 96. The Lo signal detector circuit 109 outputs a signal to the arithmetic processing circuit 110 when illumination is switched to Lo state.

The arithmetic processing circuit 110 is connected to the output sides of the above-noted right and left detector circuit 103, comparator circuit 107 and Lo signal detector circuit 109, and to the potentiometer 47. The arithmetic processing circuit 110 calculates a control amount of the drive mechanism 45 based on the signals inputted from these various circuits 103, 107 and 109 and results of detection by the potentiometer 47.

Specifically, when the signals are inputted from the comparator circuit 107 and Lo signal detector circuit 109, the arithmetic processing circuit 110 acquires an amount of rotation θH of the headlight 43 relative to the vehicle body from the result of detection by the potentiometer 47. The arithmetic processing circuit 110 calculates a control amount (amount of drive) of the drive mechanism 45 to bring an amount of rotation θH of the headlight 43 relative to the vehicle body into agreement with absolute lean angle θA. At this time, based on the result received from the right and left detector circuit 103, the arithmetic processing circuit 110 switches the direction for rotating the headlight 43 according to the leaning direction of the vehicle body, so that the headlight 43 may illuminate right forward of the vehicle body when the vehicle body leans right, and left forward when the vehicle body leans left. Then, the arithmetic processing circuit 110 outputs the control amount of the drive mechanism 45 and the direction for rotating the headlight 43 to the drive circuit 111.

Each of the processes described above is carried out on the condition that the signals are inputted from the comparator circuit 107 and Lo signal detector circuit 109, but this is not limitative. That is, the arithmetic processing circuit 110 may be arranged, while constantly carrying out each of the above processes, to output results of the processes to the drive circuit 111 on the condition that the signals are inputted from the comparator circuit 107 and Lo signal detector circuit 109.

Figure 10:
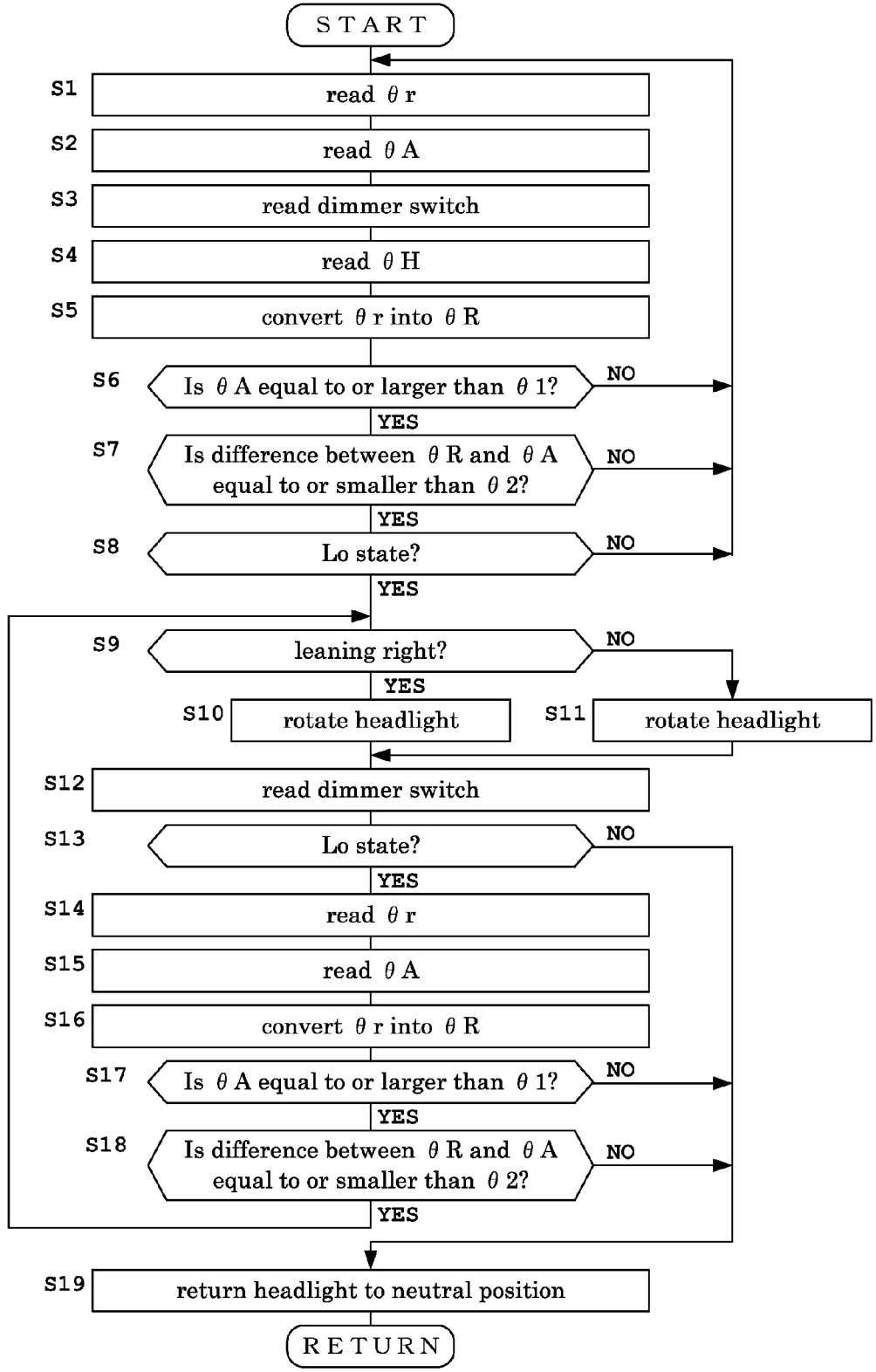
FIG. 10 is a flow chart showing an operating sequence of the saddle riding type vehicle.

Next, an example of operation of the saddle riding type vehicle 4 in Preferred Embodiment 2 will be described with reference to the drawings. Here, description will be made centering on the procedure performed by the controller 98. FIG. 10 is a flow chart showing an operating sequence of the saddle riding type vehicle 4.

Step S1: Read θr

The controller 98 reads a detection result (rotation angle θr) from the rear detector 95. The detection result is inputted to the lean angle detector circuit 104 through the filter circuit 101 and amplifier circuit 102. The lean angle detector circuit 104 outputs rotation angle θr to the converter circuit 105.

Step S2: Read θA

The controller 98 reads a detection result (absolutely lean angle θA) from the lean angle detector 97. The detection result is inputted to the right and left detector circuit 103 and lean angle detector circuit 104 through the filter circuit 101 and amplifier circuit 102. The lean angle detector circuit 104 outputs absolute lean angle θA to the comparator circuit 107.

Step S3: Read Dimmer Switch

The controller 98 reads an output signal from the dimmer switch 96. The output signal is inputted to the Lo signal detector circuit 109.

Step S4: Read θH

The controller 98 reads a detection result (amount of rotation θH) from the potentiometer 47. The detection result is inputted to the arithmetic processing circuit 110.

Step S5: Convert θr into θR

The converter circuit 105 derives relative lean angle θR from rotation angle θr. The converter circuit 105 outputs relative lean angle θR derived to the comparator circuit 107.

Step S6: Is θA Equal to or Larger than θ1?

The comparator circuit 107 determines whether or not absolute lean angle θA is equal to or larger than reference lean angle θ1. When absolute lean angle θA is equal to or larger than reference lean angle θ1, the operation proceeds to step S7. Otherwise, the operation returns to step S1.

Step S7: Is Difference Between θR and θA Equal to or Smaller than θ2?

The comparator circuit 107 determines whether or not the difference between relative lean angle θR and absolute lean angle θA is equal to or smaller than reference angle θ2. When the difference between relative lean angle θR and absolute lean angle θA is equal to or smaller than reference angle θ2, absolute lean angle θA is outputted along with a signal to the arithmetic processing circuit 110, and the operation proceeds to step S8. Otherwise, the operation returns to step S1.

Figure 11A:
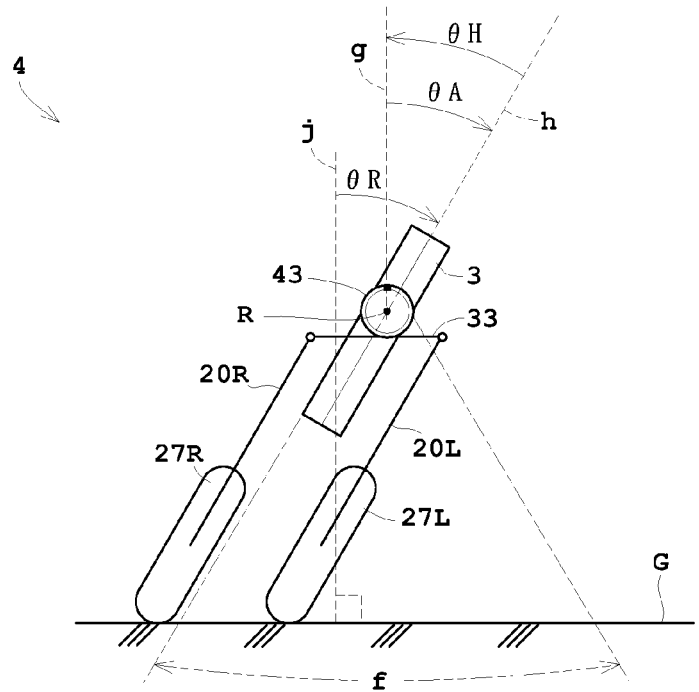
FIG. 11A is a simplified front view of the saddle riding type vehicle when a relative lean angle and an absolute lean angle are substantially in agreement.
Figure 11B:
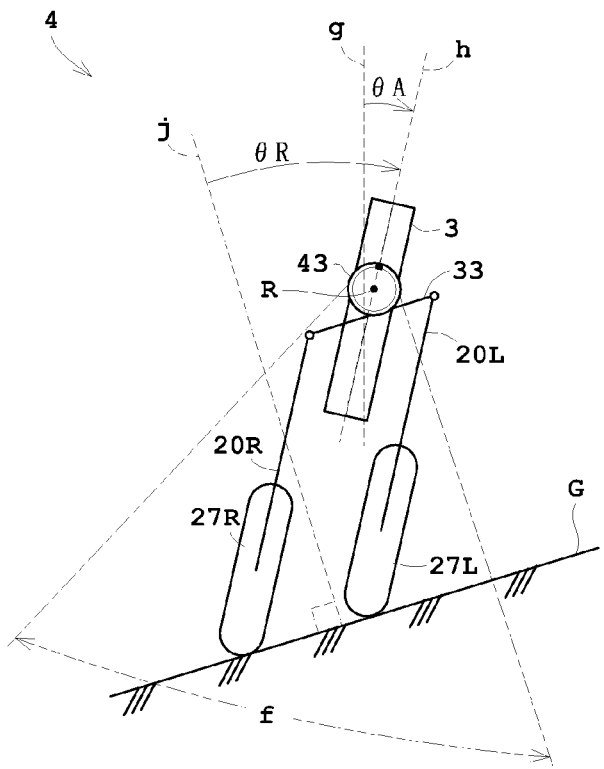
FIG. 11B is a simplified front view of the saddle riding type vehicle when the relative lean angle and absolute lean angle are widely different.

The process in step S7 will particularly be described with reference to FIGS. 11A and 11B. FIGS. 11A and 11B are schematic front views of the saddle riding type vehicle 4. FIG. 11A schematically shows a state of relative lean angle θR and absolute lean angle θA being substantially in agreement. FIG. 11B schematically shows a state of relative lean angle θR and absolute lean angle θA being widely different. In FIGS. 11A and 11B, sign "h" indicates the up-and-down direction of the vehicle body, and sign "g" indicates the direction of gravity. Axis j is vertical to the traveling surface G, and range f schematically shows the illumination range of the headlight 43.

When the traveling surface G is substantially horizontal as shown in FIG. 11A, the difference between relative lean angle θR and absolute lean angle θA is slight regardless of the position of the saddle riding type vehicle 4. In such a case, the headlight 43 can, by being rotated as shown, illuminate forward in a turning direction.

When the traveling surface G is not substantially horizontal as shown in FIG. 11B, the difference between relative lean angle θR and absolute lean angle θA is relatively large. On such traveling surface G, the saddle riding type vehicle 4, in more than a few instances, runs straight ahead with the vehicle body in an upright position substantially parallel to the direction of gravity g (i.e., in a position in which the up-and-down direction h of the vehicle body is substantially parallel to the direction of gravity g). When the headlight 43 is rotated in such a case, the headlight 43 cannot illuminate the straight forward direction. In such a case, therefore, it is desirable not to rotate the headlight 43. FIG. 11B shows a state where the headlight 43 is not rotated relative to the vehicle body.

So, when, in step S7, the difference between relative lean angle θR and absolute lean angle θA is found larger than reference angle θ2, the operation returns to step S1 without rotating the headlight 43 (see FIG. 11B).

Step S8: Lo State?

Based on the output signal from the dimmer switch 96, the Lo signal detector circuit 109 detects whether or not the direction of illumination is switched downward (Lo state) by the dimmer switch 96. When switched to Lo state, the Lo signal detector circuit 109 outputs a predetermined signal to the arithmetic processing circuit 110, and the operation proceeds to step S9. Otherwise, the operation returns to step S1.

Step S9: Leaning Right?

Based on absolute lean angle θA, the right and left detector circuit 103 determines whether the vehicle body is leaning right or left. When the result shows the vehicle body leaning right, the detector circuit 103 outputs a predetermined signal to the arithmetic processing circuit 110, and the operation proceeds to step S10. When the vehicle body is leaning left, the detector circuit 103 outputs a predetermined signal to the arithmetic processing circuit 110, and the operation proceeds to step S11.

Step S10: Rotate Headlight The arithmetic processing circuit 110 calculates a control amount of the drive mechanism 45 from amount of rotation θH, absolute lean angle θA and the output of the right and left detector circuit 103, and outputs the control amount to the drive circuit 111. The drive circuit 111 drives the drive mechanism 45 (motor 57). The drive mechanism 45 rotates the headlight 43 in a predetermined direction relative to the vehicle body. As a result, amount of rotation θH of the headlight 43 relative to the vehicle body agrees with absolute lean angle θA.

FIG. 11A shows a state where amount of rotation θH of headlight 43 relative to the vehicle body is in agreement with absolute lean angle θA.

Step S11: Rotate Headlight

The arithmetic processing circuit 110 calculates a control amount of the drive mechanism 45, and outputs the control amount to the drive circuit 111. The drive circuit 111 drives the drive mechanism 45 (motor 57). The drive mechanism 45 rotates the headlight 43 in a predetermined direction relative to the vehicle body. As a result, amount of rotation θH of the headlight 43 relative to the vehicle body agrees with absolute lean angle θA (see the FIG. 11A).

Step S12: Read Dimmer Switch

The controller 98 reads an output signal from the dimmer switch 96 again. The output signal is inputted to the Lo signal detector circuit 109.

Step S13: Lo State?

Based on the output signal from the dimmer switch 96, the Lo signal detector circuit 109 detects whether or not the direction of illumination is switched downward (Lo state) by the dimmer switch 96. When switched to Lo state, the Lo signal detector circuit 109 outputs a predetermined signal to the arithmetic processing circuit 110, and the operation proceeds to step S14. Otherwise, the operation proceeds to step S19.

Step S14: Read θr

The controller 98 reads a detection result from the rear detector 95. The detection result is inputted to the lean angle detector circuit 104. The lean angle detector circuit 104 outputs rotation angle θr to the converter circuit 105.

Step S15: Read θA

The controller 98 reads a detection result from the lean angle detector 97. The detection result is inputted to the right and left detector circuit 103 and lean angle detector circuit 104. The lean angle detector circuit 104 outputs absolute lean angle θA to the comparator circuit 107.

Step S16: Convert θR into θR

The converter circuit 105 derives relative lean angle θR from rotation angle θr. The converter circuit 105 outputs relative lean angle θR derived to the comparator circuit 107.

Step S17: Is θA Equal to or Larger than θ1?

The comparator circuit 107 determines whether or not absolute lean angle θA is equal to or larger than reference lean angle θ1. When absolute lean angle θA is equal to or larger than reference lean angle θ1, the operation proceeds to step S18. Otherwise, the operation proceeds to step S19.

Step S18: Is Difference Between θR and θA Equal to or Smaller than θ2?

The comparator circuit 107 determines whether or not the difference between relative lean angle θR and absolute lean angle θA is equal to or smaller than reference angle θ2. When the difference between relative lean angle θR and absolute lean angle θA is equal to or smaller than reference angle θ2, a signal is outputted to the arithmetic processing circuit 110, and the operation proceeds to step S9. Otherwise, the operation proceeds to step S19.

Step S19: Return Headlight to Neutral Position

The controller 98 controls the drive mechanism 45 to return the headlight 43 to neutral position (that is, neutral position relative to the vehicle body, e.g. the position where amount of rotation θH of the headlight 43 is 0). FIG. 11B shows a state where the headlight 43 is located in the neutral position. Then, the operation returns to step S1 to repeat the foregoing processes.

As described above, the saddle riding type vehicle 4 according to Preferred Embodiment 2 includes the rear detector 95 and lean angle detector 97. Thus, based on absolute lean angle θA and rotation angle θr, the controller 98 can properly acquire a positional relationship between the vehicle body (strictly, the up-and-down direction h of the vehicle body), traveling surface G and the direction of gravity g. Specifically, the controller 98 can determine not only an angle of the vehicle body leaning relative to the traveling surface G and an angle of the vehicle body leaning relative to the direction of gravity g, but also whether the saddle riding type vehicle 4 is running in an upright position on a sloping traveling surface G. Thus, according to Preferred Embodiment 2 described above, running states of the saddle riding type vehicle 4 can be determined properly.

The controller 98 does not rotate the headlight 43 when the difference between absolute lean angle θA and relative lean angle θR calculated from rotation angle θr is larger than reference angle θ2 (step S7). Consequently, even when the traveling surface G has a relatively large gradient, the headlight 43 can conveniently illuminate an area in the direction of movement of the saddle riding type vehicle 4.

The controller 98 returns the headlight 43 to the neutral position when the headlight 43 has been rotated relative to the vehicle body, in other words, when the headlight 43 is not located in the neutral position relative to the vehicle body, and the difference between absolute lean angle θA and relative lean angle θR becomes larger than reference angle θ2 (step S18). Consequently, even when the gradient of the traveling surface G changes to more than a predetermined degree, the headlight 43 can conveniently illuminate an area forward of the saddle riding type vehicle 4.

Since the main frame 3 (vehicle body) supports the headlight unit 41, the headlight 43 can be attached firmly. The drive mechanism 45 rotates the headlight 43 relative to the vehicle body. Therefore, the controller 98 can calculate, by simple arithmetic processing, an amount of rotation of the headlight 43 in order that the drive mechanism 45 to rotate the headlight 43 or return the headlight 43 to the neutral position.

Since the drive mechanism 45 rotates the headlight 43 relative to the vehicle body, the controller 98 (arithmetic processing circuit 110) can easily calculate a control amount of the drive mechanism 45 for controlling amount of rotation θH of the headlight 43 relative to the vehicle body. Thus, the controller 98 can easily and simply control amount of rotation θH of the headlight 43 relative to the vehicle body.

The controller 98 can convert rotation angle θf into relative lean angle θR accurately by using suspension lever ratio Rsar and connection lever ratio Rstr.

The present invention is not limited to the foregoing Preferred Embodiments, but may be modified as follows.

In Preferred Embodiments 1 and 2 described hereinbefore, the headlight unit 41 preferably is attached directly to the balance beam 33 or main frame 3 (vehicle body), but this is not limitative. A modification may be made in which the headlight unit 41 is attached indirectly. For example, a headlight support member may be provided to support the headlight unit 41, so that the headlight unit 41 may be attached to the balance beam 33 or main frame 3 (vehicle body) through this headlight support member.

Certain components described in Preferred Embodiment 1 and Preferred Embodiment 2 may be combined as appropriate. The front detector 91 in Preferred Embodiment 1, for example, may be replaced with the rear detector 95 described in Preferred Embodiment 2. Conversely, the rear detector 95 described in Preferred Embodiment 2 may be replaced with the front detector 91 described in Preferred Embodiment 1. Further, Preferred Embodiment 1 or Preferred Embodiment 2 may be modified to include both the front detector 91 and rear detector 95. In this case, the controller 93/98 may carry out controls based on one or both of rotation angle θf and rotation angle θr detected by the front detector 91 and rear detector 95, respectively.

In Preferred Embodiment 1, the headlight 43 is preferably supported by the balance beam 33. A modification may be made in which the headlight 43 is supported by the main frame 3 (vehicle body) as in Preferred Embodiment 2. Conversely, the headlight 43 supported by the main frame 3 (vehicle body) in Preferred Embodiment 2 may instead be supported by the balance beam 33 as in Preferred Embodiment 1.

In Preferred Embodiments 1 and 2 described hereinbefore, suspension lever ratio Rsaf/Rsar and connection lever ratio Rstf/Rstr are preferably used to obtain relative lean angle θR, but this is not limitative. In Preferred Embodiment 1, relative lean angle θR may be obtained by an appropriate technique according to the structures and mechanisms of the balance beam 33, front right side support mechanism 20R and front left side support mechanism 20L. Similarly, in Preferred Embodiment 2, relative lean angle θR may be obtained by an appropriate technique according to the structures and mechanisms of the stabilizer 73, rear right side support mechanism 60R and rear left side support mechanism 60L.

In Preferred Embodiment 2 described hereinbefore, the difference between relative lean angle θR and absolute lean angle θA preferably is compared with reference lean angle θ1, but this is not limitative. For example, a modification may be made to compare the difference between rotation angle θr and absolute lean angle θA with reference lean angle θ1. Since rotation angle θr has a value corresponding to relative lean angle θR, the controller 98 can properly determine running states of the saddle riding type vehicle 4 in such modified Preferred Embodiment also.

Although Preferred Embodiment 2 described hereinbefore does not give specific values of reference lean angle θ1 and reference angle θ2, these can be selected or designed as appropriate. At least one of reference lean angle θ1 and reference angle θ2 may be 0.

In Preferred Embodiment 2 described hereinbefore, the comparator circuit 107 preferably outputs a signal to the arithmetic processing circuit 110 when absolute lean angle A is equal to or larger than reference lean angle 1 (condition 1) and the difference between relative lean angle R and absolute lean angle A is equal to or smaller than reference angle 2 (condition 2). However, the process by the comparator circuit 107 is not limited to the above. For example, the process by the comparator circuit 107 may be modified such that the signal is outputted to the arithmetic processing circuit 110 only if the above condition 2 is satisfied. In this case, steps S6 and S17 in the processing sequence of the controller 98 (see FIG. 10) are omitted. With such modification also, the headlight 43 can conveniently illuminate forward of the saddle riding type vehicle 4.

In Preferred Embodiment 2 described hereinbefore, the controller 98 is preferably programmed to control rotation of the headlight 43 so that amount of rotation θH of the headlight 43 relative to the vehicle body may correspond to absolute lean angle θA, but this is not limitative. For example, a modification may be made in which amount of rotation θH of the headlight 43 relative to the vehicle body is adjusted to correspond to relative lean angle θR, rotation angle θr or rotation angle θf.

In each preferred embodiment described hereinbefore, the drive mechanism 45 preferably rotates the headlight 43 about the optical axis R, but this is not limitative. The drive mechanism 45 is required to have only a function to move the illumination range f of the headlight 43 between right forward and left forward of the saddle riding type vehicles 1/4. For example, a modified mechanism may be used to rotate the headlight 43 about an axis different from the optical axis R.

Each preferred embodiment described hereinbefore preferably illustrates a four-wheeled vehicle with the right and left wheels 27 and right and left wheels 63 at the front and rear of the vehicle body, but this is not limitative. For example, a change may be made to a three-wheeled vehicle with a single wheel at the front or rear.

Although the single headlight 43 is preferably provided in each preferred embodiment described hereinbefore, a modification may be made to provide a plurality of headlights 43. For example, two headlights 43 may be attached to the balance beam 33 to illuminate the direction of movement with the two lights 43. Two headlights 43 may be attached to the main frame 3 (vehicle body).

Preferred Embodiments 1 and 2 and the modifications described above may be further varied as appropriate by replacing or combining certain components with other modifications.

The present invention may be embodied in other specific embodiments and forms without departing from the spirit or essential attributes thereof and, accordingly, reference should be made to the appended claims, rather than to the foregoing specification, as indicating the scope of the invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle riding type vehicle capable of making turns by leaning a vehicle body, the saddle riding type vehicle comprising:
   a vehicle body;
   at least one headlight;
   a drive mechanism arranged to rotate the at least one headlight;
   a right wheel and a left wheel provided at opposite sides of the vehicle body and arranged to move up and down;
   a balancer member rotatably mounted on the vehicle body and arranged to allow the right wheel and the left wheel to move up and down in opposite directions;
   a detector arranged to detect a rotation angle of the balancer member relative to the vehicle body; and
   a controller programmed to control the drive mechanism based on a result of a detection by the detector.

2. The vehicle according to claim 1, wherein the controller is programmed to calculate a relative lean angle which is an angle of the vehicle body leaning relative to a traveling surface, based on the result of detection by the detector, and to cause an amount of rotation of the at least one headlight relative to the vehicle body to correspond to the relative lean angle.

3. The vehicle according to claim 1, further comprising:
   a right side support mechanism rockably supported by the vehicle body and arranged to support the right wheel to be movable up and down; and
   a left side support mechanism rockably supported by the vehicle body and arranged to support the left wheel to be movable up and down; wherein
   the balancer member is interlocked to the right side support mechanism and the left side support mechanism; and
   the controller is programmed to use a connection lever ratio which is a ratio between a spacing between a connecting position where the right side support mechanism is connected to the right wheel and a connecting position where the left side support mechanism is connected to the left wheel, and a spacing between connecting positions where the right side support mechanism and the left side support mechanism are connected to the balancer member, respectively, and to use a suspension lever ratio which is a ratio between one of a rocking radius of the right wheel provided by the right side support mechanism and a rocking radius of the left wheel provided by the left side support mechanism, and one of a rocking radius of the balancer member provided by the right side support mechanism and a rocking radius of the balancer member provided by the left side support mechanism, so as to calculate the relative lean angle by multiplying the rotation angle obtained from the detector by the connection lever ratio and the suspension lever ratio.

4. The vehicle according to claim 3, wherein:
the right wheel and the left wheel include a pair of front wheels provided at a front portion of the vehicle body;
the balancer member includes a front balancer member corresponding to the pair of front wheels; and
the detector includes a front detector arranged to detect a rotation angle of the front balancer member relative to the vehicle body.

5. The vehicle according to claim 4, wherein:
the right side support mechanism and the left side support mechanism include a front right side support mechanism and a front left side support mechanism arranged to support the pair of front wheels, respectively; and
the controller is programmed to calculate the relative lean angle by multiplying the rotation angle obtained from the detector by the connection lever ratio and the suspension lever ratio corresponding to the pair of front wheels, the front right side support mechanism, the front left side support mechanism, and the front balancer member.

6. The vehicle according to claim 3, wherein:
the right wheel and the left wheel include a pair of rear wheels provided at a rear portion of the vehicle body;
the balancer member includes a rear balancer member corresponding to the pair of rear wheels; and
the detector includes a rear detector arranged to detect a rotation angle of the rear balancer member relative to the vehicle body.

7. The vehicle according to claim 6, wherein:
the right side support mechanism and the left side support mechanism include a rear right side support mechanism and a rear left side support mechanism arranged to support the pair of rear wheels, respectively; and
the controller is programmed to calculate the relative lean angle by multiplying the rotation angle obtained from the detector by the connection lever ratio and the suspension lever ratio corresponding to the pair of rear wheels, the rear right side support mechanism, the rear left side support mechanism, and the rear balancer member.

8. The vehicle according to claim 1, wherein the at least one headlight is rotatably supported by one of the vehicle body and the balancer member.

9. A saddle riding type vehicle capable of making turns by leaning a vehicle body, the saddle riding type vehicle comprising:
a vehicle body;
at least one headlight;
a drive mechanism arranged to rotate the at least one headlight;
a right wheel and a left wheel provided at opposite sides of the vehicle body and arranged to move up and down;
a balancer member rotatably mounted on the vehicle body and arranged to allow the right wheel and the left wheel to move up and down in opposite directions;
a lean angle detector arranged to detect an absolute lean angle which is an angle of the vehicle body leaning relative to a direction of gravity;
a rotation angle detector arranged to detect a rotation angle of the balancer member relative to the vehicle body; and
a controller programmed to control the drive mechanism based on results of a detection by the lean angle detector and a detection of the rotation angle detector.

10. The vehicle according to claim 9, wherein the controller is programmed to prevent rotation of the at least one headlight relative to the vehicle body when a difference between the absolute lean angle and the rotation angle is at least a predetermined value.

11. The vehicle according to claim 9, wherein the controller is programmed to control the drive mechanism to return the at least one headlight to a neutral position relative to the vehicle body when the at least one headlight is away from the neutral position and a difference between the absolute lean angle and the rotation angle reaches at least a predetermined value.

12. The vehicle according to claim 9, wherein the controller is programmed to calculate a relative lean angle which is an angle of the vehicle body leaning relative to a traveling surface, based on the result of the detection by the rotation angle detector, and to prevent rotation of the at least one headlight relative to the vehicle body when a difference between the relative lean angle calculated and the absolute lean angle is at least a predetermined value.

13. The vehicle according to claim 9, wherein the controller is programmed to calculate a relative lean angle which is an angle of the vehicle body leaning relative to a traveling surface, based on the result of the detection by the rotation angle detector, and to control the drive mechanism to return the at least one headlight to a neutral position relative to the vehicle body when the at least one headlight is away from the neutral position and a difference between the relative lean angle and the absolute lean angle reaches at least a predetermined value.

14. The vehicle according to claim 9, wherein the controller is arranged, when rotating the at least one headlight, to cause an amount of rotation of the at least one headlight relative to the vehicle body to correspond to one of the rotation angle and the absolute lean angle.

15. The vehicle according to claim 9, wherein the at least one headlight is rotatably supported by one of the vehicle body and the balancer member.

* * * * *